(12) United States Patent
Ueno

(10) Patent No.: US 8,152,383 B2
(45) Date of Patent: Apr. 10, 2012

(54) TAPERED ROLLER BEARING

(75) Inventor: Takashi Ueno, Iwata (JP)

(73) Assignee: NTN Corporation, Osaka (JP)

( * ) Notice: Subject to any disclaimer, the term of this patent is extended or adjusted under 35 U.S.C. 154(b) by 626 days.

(21) Appl. No.: 12/309,815

(22) PCT Filed: Apr. 25, 2007

(86) PCT No.: PCT/JP2007/058974
§ 371 (c)(1),
(2), (4) Date: Jan. 30, 2009

(87) PCT Pub. No.: WO2008/015829
PCT Pub. Date: Feb. 7, 2008

(65) Prior Publication Data
US 2010/0002975 A1 Jan. 7, 2010

(30) Foreign Application Priority Data
Aug. 1, 2006 (JP) .................. 2006-209994

(51) Int. Cl.
*F16C 33/58* (2006.01)
(52) U.S. Cl. ..................................... 384/571
(58) Field of Classification Search .......... 384/571, 384/572, 576, 625
See application file for complete search history.

(56) References Cited

U.S. PATENT DOCUMENTS

| | | | |
|---|---|---|---|
| 5,064,298 A * | 11/1991 | Hibi et al. | 384/625 |
| 6,086,261 A * | 7/2000 | Nakagawa et al. | 384/571 |
| 6,328,477 B1 | 12/2001 | Tsujimoto et al. | |
| 2001/0031105 A1 | 10/2001 | Tsujimoto et al. | |
| 2002/0186908 A1 | 12/2002 | Tsujimoto et al. | |
| 2004/0017957 A1 | 1/2004 | Matsuyama et al. | |
| 2004/0047528 A1 | 3/2004 | Tsujimoto et al. | |
| 2006/0002646 A1 | 1/2006 | Tsujimoto | |
| 2007/0014501 A1 * | 1/2007 | Ueno et al. | 384/571 |
| 2009/0016664 A1 * | 1/2009 | Tsujimoto | 384/576 |

FOREIGN PATENT DOCUMENTS

EP 1 770 294 4/2007
(Continued)

OTHER PUBLICATIONS

International Preliminary Report on Patentability mailed Feb. 19, 2009 for International Application No. PCT/JP2007/058974.

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

In a tapered roller bearing, the roller coefficient γ is greater than 0.94. At least one member of an inner ring, an outer ring, and the tapered rollers includes a nitrogen-rich layer, and the grain size number of austenite crystal grains in the nitrogen-rich layer is greater than 10. A cage of the tapered roller bearing includes a small annular portion continuous on a small end face side of the tapered rollers, a large annular portion continuous on a large end face side of the tapered rollers, and a plurality of bars that connect the small and large annular portions. The cage has trapezoidal pockets between adjacent ones of the bars. Each of the bars has cut-away portions on the narrow side of the pockets.

20 Claims, 19 Drawing Sheets

FOREIGN PATENT DOCUMENTS

| | | | |
|---|---|---|---|
| JP | 09-032858 | | 2/1997 |
| JP | 09-096352 | | 4/1997 |
| JP | 10-089353 | | 4/1998 |
| JP | 11-201149 | | 7/1999 |
| JP | 11-210765 | | 8/1999 |
| JP | 11-336768 | | 12/1999 |
| JP | 2000-161349 | | 6/2000 |
| JP | 2000-170774 | | 6/2000 |
| JP | 2000-170775 | | 6/2000 |
| JP | 2002-235752 | | 8/2002 |
| JP | 2002-253752 | * | 9/2002 |
| JP | 2003-254338 | * | 9/2003 |
| JP | 2003-343552 | | 12/2003 |
| JP | 2005-069421 | | 3/2005 |
| JP | 2006-22934 | | 1/2006 |
| JP | 2006-022935 | * | 1/2006 |
| JP | 2006-22935 | | 1/2006 |

OTHER PUBLICATIONS

Written Opinion of the International Searching Authority mailed Feb. 19, 2009 for International Application No. PCT/JP2007/058974.

International Search Report mailed Aug. 7, 2007 for International Application No. PCT/JP2007/058974.

* cited by examiner

| Bearing | Roller coefficient | Life | Note |
|---|---|---|---|
| Comparative Example 1 (conventional product, iron plate-made retainer) | 0.86 | 16.4 hours | inner ring flaking |
| Comparative Example 2 (iron plate-made retainer) | 0.96 | 40.2 hours | Stopped due to torque increase caused by wear of retainer |
| Example | 0.96 | 200 hours or more | No abnormality, test was terminated |

Fig. 19A
Fig. 19B
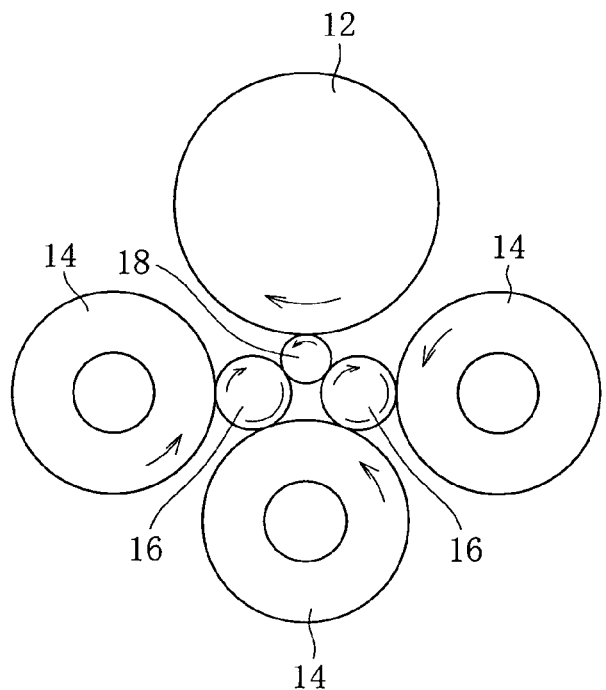
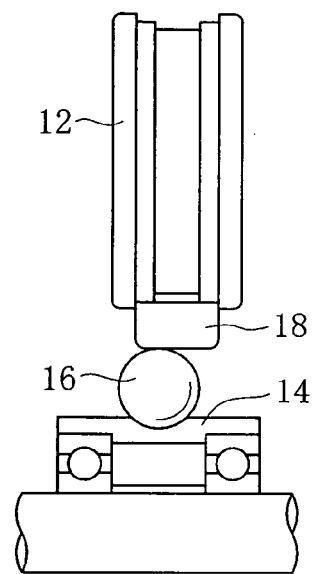
Fig. 20
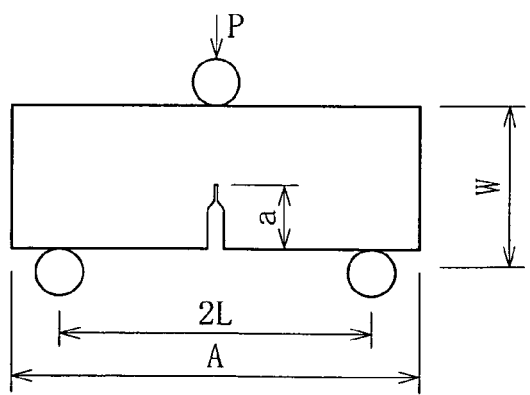

TAPERED ROLLER BEARING

TECHNICAL FIELD

The present invention relates to tapered roller bearings that can be used as bearings of gear shaft supporting devices for vehicles, such as differentials and transmissions of automotive vehicles.

BACKGROUND ART

A tapered roller bearing comprises main components including: an inner ring having a raceway surface on its radially outer surface and further having a cone front face rib and a cone back face rib on axially opposite sides of the raceway surface; an outer ring having a raceway surface on its radially inner surface; a plurality of tapered rollers interposed between the raceway surfaces of the inner and outer rings; and a cage having pockets for containing and holding the tapered rollers. The cage includes: a small annular portion that is continuous on the small end face side of the tapered rollers; a large annular portion that is continuous on the large end face side of the tapered rollers; and a plurality of bars that connect the small and large annular portions. Each pocket is formed between adjacent ones of the bars and has a trapezoidal shape having a narrow side that receives the small diameter side of the tapered roller and a wide side that receives the large diameter side of the tapered roller.

Tapered roller bearings for supporting power transmission shafts of, for example, differentials and transmissions of automotive vehicles are used with their lower portions immersed in oil baths, and the oil in the oil baths that serves as a lubricating oil flows into the bearings as the bearings rotate. In a tapered roller bearing used for such applications, the lubricating oil flows from the small diameter side of the tapered rollers into the bearing. The lubricating oil flowing from the radially outer side of the cage flows along the raceway surface of the outer ring and passes therethrough toward the large diameter side of the tapered rollers. The lubricating oil flowing from the radially inner side of the cage flows along the raceway surface of the inner ring and passes therethrough toward the large diameter side of the tapered rollers.

In some of the tapered roller bearings used for parts into which the lubricating oil flows from the outside, cut-away portions are provided in each pocket of the cage such that the separate flows of the lubricating oil on the radially outer and inner sides of the cage pass through the respective cut-away portions. With such a configuration, the circulation of the lubricating oil in the bearings is improved (refer to Patent Documents 1 and 2). In the bearing described in Patent Document 1, cut-away portions 10d are provided in the central portions of bars 8 between pockets 9 of a cage 5, as shown in FIG. 21A, so that foreign substances contained in the lubricating oil are prevented from staying inside the bearing. In the bearing described in Patent Document 2, cut-away portions 10e are provided in a small annular portion 6 and a large annular portion 7 on axially opposite sides of each pocket 9 of a cage 5, as shown in FIG. 21B, so that the flow of the lubricating oil from the radially outer side of the cage toward the inner ring side is facilitated. Note that the dimensions of the pockets 9 in the drawings are the values used for Comparative Examples in a torque measurement test described later.

[Patent Document 1] Japanese Patent Application Laid-Open No. Hei 09-032858.
[Patent Document 2] Japanese Patent Application Laid-Open No. Hei 11-201149.
[Patent Document 3] Japanese Patent Application Laid-Open No. Hei 09-096352.
[Patent Document 4] Japanese Patent Application Laid-Open No. Hei 11-210765.

SUMMARY OF THE INVENTION

Problems to be Solved by the Invention

In each of the tapered roller bearings described above, the lubricating oil flows into the bearing from the radially outer and inner sides of the cage. However, it has been found that, as the ratio of the lubricating oil flowing from the radially inner side of the cage toward the inner ring increases, the torque loss increases. The reason for this may be as follows.

The lubricating oil flowing from the radially outer side of the cage toward the outer ring side flows along the raceway surface of the outer ring, smoothly passes therethrough toward the large diameter side of the tapered rollers since no obstacle is present on the radially inner surface of the outer ring, and then flows out of the bearing. However, the cone back face rib is provided on the radially outer surface of the inner ring. Therefore, when the lubricating oil flowing from the radially inner side of the cage toward the inner ring side flows along the raceway surface of the inner ring and passes therethrough toward the large diameter side of the tapered rollers, the flow of the lubricating oil may be blocked by the cone back face rib and tends to stay inside the bearing. Accordingly, as the ratio of the lubricating oil flowing from the radially inner side of the cage toward the inner ring side increases, the amount of the lubricating oil staying inside the bearing increases. The lubricating oil staying inside the bearing may cause flow resistance to rotation of the bearing, and therefore the torque loss increases.

Therefore, in the tapered roller bearings into which the lubricating oil flows, the torque loss due to resistance of the lubricating oil must be reduced. The above is a method for reducing the flow resistance of oil to achieve torque reduction. However, to reduce the torque significantly, the specifications of bearings must be changed such that rolling viscous resistance is reduced. Unfortunately, with conventional torque reduction methods (Patent Documents 3 to 5), the torque can be reduced without a reduction in the rated load, but the stiffness of the bearing is reduced to some extent.

It is a principal object of this invention to provide a tapered roller bearing which can achieve a reduction in torque and have excellent seizing resistance without a reduction in the stiffness of the bearing.

Means for Solving the Problems

This invention solves the problems by reducing the pitch circle diameter (PCD) of rollers without reducing the number of the rollers or with the number of the rollers increased. FIG. 23 shows stiffness ratio (solid circles) and torque ratio (open circles) when the PCD of a tapered roller bearing is changed. The results of the computation of the amount of elastic deformation of rollers show that, as the PCD decreases, the torque of the bearing decreases significantly, but the stiffness of the bearing does not decrease significantly, as shown in FIG. 23. Therefore, a reduction in torque without a reduction in stiffness can be obtained by reducing the PCD without reducing the number of rollers or with the number of the rollers increased.

Accordingly, a tapered roller bearing of the present invention comprises: an inner ring; an outer ring; a plurality of tapered rollers rollably disposed between the inner ring and the outer ring; and a cage for holding the tapered rollers at predetermined circumferential intervals, wherein: a roller coefficient γ is greater than 0.94; at least one member of the inner ring, the outer ring, and the tapered rollers has a nitrogen-rich layer, and a grain size number of austenite crystal grains in the nitrogen-rich layer is greater than 10; the inner ring has a cone back face rib having a surface including a conical surface in contact with large end faces of the tapered rollers and a flank that smoothly extends outwardly from the conical surface and is curved in a direction away from the large end faces of the tapered rollers; the cage includes a small annular portion continuous on a small end face side of the tapered rollers, a large annular portion continuous on a large end face side of the tapered rollers, and a plurality of bars for connecting the small annular portion and the large annular portion; trapezoidal pockets are formed between adjacent ones of the bars, each of the pockets having a narrow side that receives a small diameter side of one of the tapered rollers and a wide side that receives a large diameter side of the one of the tapered rollers; and each of the bars has a notch on the narrow side of the pockets.

The roller coefficient γ (a roller filling factor) is a parameter defined by (the number of rollers×the average diameter of the rollers)/(π×PCD). When the average diameter of the rollers is constant, the number of the rollers increases as the value of γ increases. A typical conventional tapered roller bearing provided with a cage is normally designed such that the roller coefficient γ is 0.94 or less. The roller coefficient γ exceeding 0.94 means that the roller filling factor and accordingly the stiffness of the bearing, are greater than those of conventional products.

The nitrogen-rich layer is a layer containing an increased amount of nitrogen and formed in a surface layer of the bearing ring (the outer or inner ring) or each tapered roller. The nitrogen-rich layer can be formed by treatment such as carbonitriding or nitriding. The nitrogen content in the nitrogen-rich layer is preferably in the range of 0.1% to 0.7%. When the nitrogen content is less that 0.1%, no advantageous effect is obtained. In particular, the rolling contact life in the presence of foreign matter is reduced. When the nitrogen content is greater than 0.7%, voids are formed, or the amount of retained austenite is excessively large. In such cases, a sufficient hardness may not be obtained, and the life is thereby reduced. The nitrogen content in the nitrogen-rich layer formed in the bearing ring is a value at 50 μm depth in the surface layer of the raceway surface after grinding and can be measured using, for example, a PMA (wavelength-dispersive X-ray microanalyzer).

By reducing the size of the austenite grains to the extent that the grain size number of the austenite crystal grains exceeds 10, the rolling contact fatigue life can be significantly improved. When the grain size number of the austenite grains is 10 or less, the rolling contact fatigue life is not improved significantly. Therefore, the grain size number is adjusted to greater than 10. Normally, the grain size number is adjusted to 11 or more. The smaller the size of austenite grains, the more desirable. However, it is generally difficult to obtain a grain size number exceeding 13. It should be noted that the austenite grains in the above bearing components are not changed in the surface layer having the nitrogen-rich layer and also in the inner portion. Therefore, the target areas for the above crystal grain size number are the surface layer and the inner portion. Even after quenching, for example, is performed, the original locations of the austenite crystal grain boundaries just before the quenching can be observed. The austenite crystal grains refer to crystal grains determined based on the remaining original locations.

The bars have cut-away portions on the narrow side of the trapezoidal pockets of the cage. By providing the cut-away portions, the following advantage is obtained. That is, the lubricating oil flowing from the radially inner side of the cage toward the inner ring side is allowed to rapidly flow toward the outer ring side through the cut-away portions. Accordingly, the amount of the lubricating oil flowing along the raceway surface of the inner ring and reaching the cone back face rib is reduced, and the amount of the lubricating oil staying inside the bearing is thereby reduced. Therefore, the torque loss due to the flow resistance of the rubricating oil is reduced.

As described above, the surface of the cone back face rib of the inner ring includes the conical surface that comes into contact with the large end faces of the tapered rollers, and the curved flank is smoothly connected to the conical surface. In addition, an acute wedge-shaped gap is formed in proximity to the outer periphery of each contact area. In this manner, the drawing action on the lubricating oil toward the contact area is improved, and a sufficient oil film can be formed. Moreover, the smoothly formed flank can prevent the formation of flaws caused by contact with the surface of the cone back face rib of the inner ring when the tapered roller is skewed.

The flank may have an arc-like cross-sectional shape. With such a configuration, the flank that can provide an excellent drawing action on lubricating oil can be easily formed.

A recess having a circular shape may be provided in a central portion of each of the large end faces of the tapered rollers, and an outer periphery of the recess may be located in proximity to a boundary between the conical surface of the surface of the cone back face rib of the inner ring and the flank. With such a configuration, the lubricating oil can be introduced to the vicinity of the wedge-shaped gap to supply a sufficient amount of the lubricating oil to the wedge-shaped gap. In addition, the allowable skew angle of the tapered rollers can be further increased.

The boundary between the conical surface of the surface of the cone back face rib of the inner ring and the flank may be located in proximity to an outer periphery of a maximum contact ellipse that is formed by contact between the large end faces of the tapered rollers and the surface of the cone back face rib of the inner ring. With such a configuration, the wedge-shaped gap can be appropriately formed so as to draw the lubricating oil over the entire range of load on the tapered roller bearing.

The inner ring may have a cone front face rib having a surface including a surface parallel to small end faces of the tapered rollers, and $R/R_0$ may fall within the range of 0.75 to 0.87, where R is a radius of curvature of the large end faces of the tapered rollers, and $R_0$ is a distance from an apex of a cone angle of each of the tapered rollers to the surface of the cone back face rib of the inner ring. With such a configuration, the occurrence of galling due to the skew of the rollers can be prevented, so that the seizing resistance is improved.

The reason that the surface of the cone front face rib of the inner ring includes the surface parallel to the small end faces of the tapered rollers is as follows. As enlarged in FIG. 26, the surface of the cone front face rib 2c of an inner ring 2 is formed so as to be parallel to the small end faces 4c of tapered rollers 4 disposed on a raceway surface 2a. In this manner, the influences of the chamfering dimensions and shape variations of the small end faces 4c of the tapered rollers 4 on the gaps between the large end faces 4a of the tapered rollers 4 and the surface of the cone back face rib 2b of the inner ring 2 in the above-described initial assembled state can be eliminated. (Note that the size of the above gaps in the initial assembled state is the same as the size of the gaps s between the small end faces 4c and the surface of the cone front face rib 2c of the inner ring 2 when the tapered rollers 4 are placed in position.) More specifically, in the initial assembled state, each of the small end faces 4c and the surface of the cone front face rib 2c parallel to each other come into surface contact with each other even when the chamfering dimensions and shapes of the small end faces 4c are different from each other as shown by broken lines in FIG. 26. Therefore, the gaps between the large end faces 4a and the surface of the cone back face rib 2b are always constant in the initial assembled state. Accordingly, variations in time until the tapered rollers 4 are placed in position can be eliminated, and the running-in period can be reduced.

The reason that the ratio $R/R_0$ of the radius of curvature R of the large end faces of the tapered rollers to the distance $R_0$ from the apex of the cone angle of each of the tapered rollers to the surface of the cone back face rib of the inner ring falls within the range of 0.75 to 0.87 is as follows.

FIG. 27 shows the results of the computation of the thickness t of the oil film formed between the surface of the cone back face rib of an inner ring and the large end face of a tapered roller using the Karna equation. The horizontal axis represents $R/R_0$, and the vertical axis represents the ratio $t/t_0$ of the oil film thickness t to the oil film thickness to at $R/R_0=0.76$. The oil film thickness t reaches its maximum when $R/R_0=0.76$. When $R/R_0$ exceeds 0.9, the oil film thickness t decreases steeply.

FIG. 28 shows the results of the computation of a maximum hertz stress p between the surface of the cone back face rib of an inner ring and the large end face of a tapered roller. The horizontal axis represents $R/R_0$ as in FIG. 27, and the vertical axis represents the ratio $p/p_0$ of the maximum hertz stress p to the maximum hertz stress $p_0$ at $R/R_0=0.76$. The maximum hertz stress p monotonically decreases as $R/R_0$ increases.

To reduce the torque loss and heat generation caused by slip friction between the surface of the cone back face rib of the inner ring and the large end faces of the tapered rollers, it is desirable to increase the oil film thickness t and to reduce the maximum hertz stress p. With reference to the computational results shown in FIGS. 27 and 28, the appropriate range of $R/R_0$ is set in the range of 0.75 to 0.87 based on the seizing resistance test results shown in Table 1 described later. Note that conventional tapered roller bearings are designed to have $R/R_0$ of 0.90 to 0.97.

When the above tapered roller bearing is used for a vehicle gear shaft supporting device in which the gear shaft is rotatably supported by the tapered roller bearing in a housing containing a gear oil, not only the torque loss and heat generation caused by friction in the gear shaft supporting device are reduced, so that the durability is improved, but also the running-in period can be reduced.

The surface of the cone back face rib of the inner ring may have a surface roughness Ra of 0.05 to 0.20 μm. With such a configuration, the lubrication between the surface of the cone back face rib of the inner ring and the large end face of the tapered roller can be maintained in good conditions according to the relationship with the oil film thickness t formed between the surface of the cone back face rib and the large end face of the tapered roller. When this tapered roller bearing is used for a vehicle gear shaft supporting device in which the gear shaft is rotatably supported by the tapered roller bearing in a housing containing a gear oil, the lubrication between the surface of the cone back face rib of the inner ring and the large end face of the tapered roller can be maintained in good conditions, and the durability of the gear shaft supporting device can be further improved.

The reason that the lower limit of the surface roughness Ra of surface of the cone back face rib of the inner ring is set to 0.05 μm is as follows. After being installed, the tapered roller bearing is run-in at a low rotation speed of about 50 to 100 r/min while an axial load is applied to the end face of the inner ring. When the surface roughness Ra is less than 0.05 μm, the lubricating state between the surface of the cone back face rib of the inner ring and the large end face of the tapered bearing during the running-in period is mixed-lubrication of fluid lubrication and boundary lubrication. Therefore, the friction coefficient varies significantly, and variations in the measured shaft torque increase. In addition, the control accuracy of preload is impaired. When the surface roughness Ra is 0.05 μm or more, the lubrication state is boundary lubrication. In such a case, the friction coefficient is stabilized, and the preload can be controlled with high accuracy. Under normal use conditions of the bearing wherein the rotation speed is greater than 100 r/min, a sufficient oil film is formed between the surface of the cone back face rib and the large end face. Therefore, the lubrication state therebetween is fluid lubrication, and the friction coefficient is reduced.

The reason that the upper limit of the surface roughness Ra of the surface of the cone back face rib of the inner ring is set to 0.20 μm is as follows. When the surface roughness Ra exceeds 0.20 μm, the temperature of the bearing is increased in a high rotation region to cause a reduction in the viscosity of the lubricating oil. In such a case, the thickness t of the oil film becomes insufficient, and seizing tends to occur.

A window angle of each of the pockets may be 55° or more and 80° or less. The window angle is the angle formed by side surfaces of adjacent bars in contact with the rolling surface of a roller. The reason that the window angle is set to 55° or more is to ensure good contact conditions with the roller. The reason that the window angle is set to 80° or less is as follows. When the window angle is greater than 80°, the radial pressing force increases. In such a case, even when a resin material having self lubricating properties is used, smooth rotation may not be obtained. Note that, in conventional cages, the window angle is 25° to 50°.

The cage may be formed of an engineering plastic excellent in mechanical strength, oil resistance, and heat resistance. A cage in which a resin material is used is characterized by having a lighter cage weight, better self-lubricating properties, and a smaller friction coefficient as compared to a cage made of an iron plate. These characteristics are combined with the action of lubricating oil present in the bearing, whereby the occurrence of wear due to contact with the outer ring can be suppressed. Such a resin material has a lighter weight and a lower friction coefficient as compared with a steel plate and thus is suitable for reducing torque loss at the time of starting the bearing and wear of the cage.

Each of the pockets may further have a notch provided in the small annular portion on the narrow side thereof. With such a configuration, the lubricating oil flowing from the radially inner side of the cage toward the inner ring side is allowed to flow toward the outer ring side also through the notch. Accordingly, the amount of the lubricating oil flowing along the raceway surface of the inner ring and reaching the cone back face rib is further reduced, and the torque loss due to the flow resistance of the rubricating oil is further reduced.

Each of the pockets may further have a notch provided on the wide side thereof, the notch being provided in at least one of the bars. With such a configuration, the tapered rollers can be brought into contact with the bars in a well-balanced manner.

A total area of the cut-away portions provided on the narrow side of the pockets may be greater than a total area of the cut-away portions provided on the wide side of the pockets. With such a configuration, the amount of the lubricating oil flowing along the raceway surface of the inner ring and reaching the cone back face rib can be reduced, and the torque loss due to the flow resistance of the rubricating oil can be further reduced.

The cage may have a radially inward rib provided on an axially outer side of the small annular portion of the cage, the radially inward rib facing a radially outer surface of the cone front face rib of the inner ring. In addition, an upper limit of a gap between a radially inner surface of the radially inward rib and the radially outer surface of the cone front face rib of the inner ring may be 2.0% of an outer radial dimension of the cone front face rib. With such a configuration, the amount of the lubricating oil flowing from the radially inner side of the cage toward the inner ring side can be reduced, and the torque loss due to the flow resistance of the rubricating oil can be further reduced.

A large number of micro-recessed dents may be randomly formed at least on surfaces of the tapered rollers. A surface roughness parameter Ryni of the surfaces having the dents may be 0.4 µm≦Ryni≦1.0 µm, and an Sk value of the surfaces having the dents may be −1.6 or less. With such a configuration, the lubricating oil can be uniformly held on the surfaces of the tapered rollers. Therefore, even when the amount of the lubricating oil staying inside the bearing is reduced, the contact portions between the tapered rollers and the inner and outer rings can be sufficiently lubricated.

The parameter Ryni is the average value of maximum heights in portions having a reference length. More specifically, portions having the reference length in an averaging line direction are extracted from a roughness curve, and the distance between a peak line and a bottom line in each of the extracted portions is measured along the vertical magnification direction of the roughness curve (ISO 4287: 1997). The Sk value indicates the skewness of the roughness curve, i.e., the asymmetricity of the irregularity distribution (ISO 4287: 1997). The Sk value is close to zero for a symmetric distribution such as a Gaussian distribution. The Sk value is negative when protruding portions are eliminated from the irregularities and is positive when recessed portions are eliminated. The Sk value can be controlled by selecting the rotation speed of a barrel polishing apparatus, processing time, the amount of work fed, the type and size of a polishing chip, and the like. By adjusting the Sk values to −1.6 or less, the lubricating oil can be uniformly held in a large number of the micro-recessed dents.

The tapered roller bearing is suitable for a bearing that supports a power transmission shaft of an automotive vehicle.

Effects of the Invention

According to the present invention, the torque of a bearing can be reduced without a reduction in the stiffness of the bearing. More specifically, the pillar potions of the cage have cut-away portions provided on the narrow side of the trapezoidal pockets. Each notch extends through the pillar portion from the radially outer side to the radially inner side. In this manner, the lubricating oil flowing from the radially inner side of the cage toward the inner ring side is allowed to rapidly flow toward the outer ring side through the cut-away portions. Therefore, the amount of the lubricating oil flowing along the raceway surface of the inner ring and reaching the cone back face rib is reduced, and the amount of the lubricating oil staying inside the bearing is reduced, so that the torque loss due to the flow resistance of the rubricating oil is reduced.

Moreover, the surface of the cone back face rib of the inner ring has a conical surface that comes into contact with the large end faces of the tapered rollers, and a curved flank is smoothly connected to the conical surface. In addition, the radius of curvature R of the large end faces of the tapered rollers is set to a value in the range of $R/R_0=0.75$ to $0.87$. In this manner, the torque loss and heat generation due to slip friction between the surface of the cone back face rib of the inner ring and the large end faces of the tapered rollers can be reduced, and the occurrence of seizing can thereby be prevented.

By setting the roller coefficient γ to greater than 0.94, a reduction in stiffness can be prevented. Moreover, by setting the roller coefficient γ to greater than 0.94, not only the load capacity increases, but also the maximum surface pressure on the raceway surfaces can be reduced. Therefore, the occurrence of very short-life surface-originated flaking under severe lubricating conditions can be prevented.

In addition, in the tapered roller bearing of this invention, a nitrogen-rich layer is formed, and the size of austenite grains is reduced such that the grain size number of the austenite grains is 11 or more. Therefore, the rolling contact fatigue life is significantly improved, and good crack resistant strength and resistance to dimensional changes over time can be obtained.

BRIEF DESCRIPTION OF THE DRAWINGS

FIG. 19A is a schematic diagram of a rolling contact fatigue life testing machine.

FIG. 19B is a side view of the rolling contact fatigue life testing machine.

FIG. 20 is a diagram illustrating a test piece for static fracture toughness test.

Figure 1A:
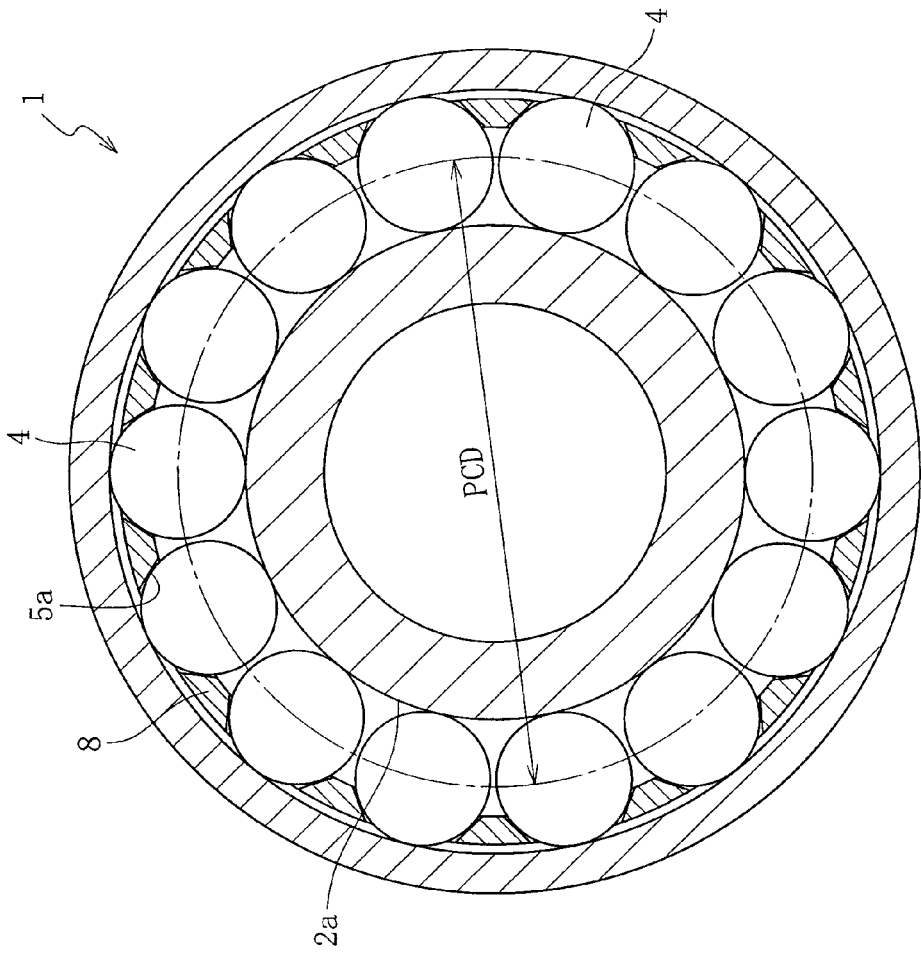
FIG. 1A is a horizontal cross-sectional view of a tapered roller bearing of an embodiment of the present invention.

DESCRIPTION OF REFERENCE NUMERALS 1a, 1b tapered roller bearing
2 inner ring
2a raceway surface
2b surface of cone back face rib
2c surface of cone front face rib
3 outer ring
3a raceway surface
4 tapered roller
4a large end face
4b recess
4c small end face
5 cage
6 small annular portion
7 large annular portion
8 pillar portion
9 pocket
10a, 10b, 10c notch
11 rib

DETAILED DESCRIPTION OF THE INVENTION

Hereinafter, embodiments of the invention will be described in accordance with the drawings.

Figure 1B:
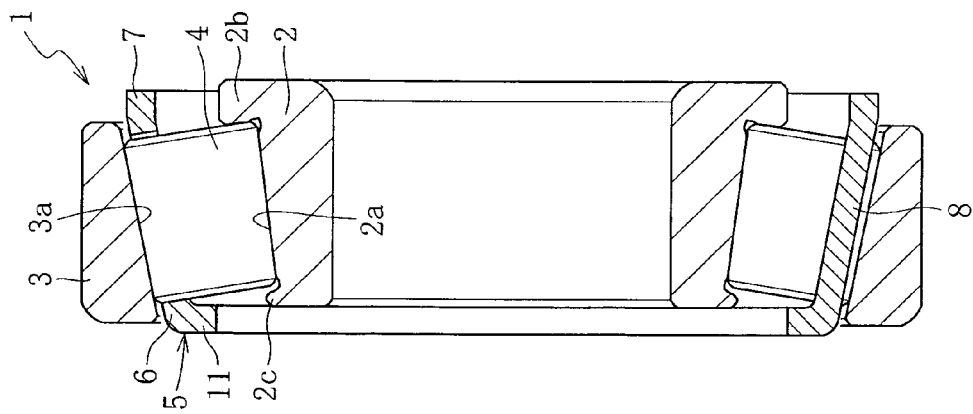
FIG. 1B is a vertical cross-sectional view of the bearing.

A tapered roller bearing 1 shown in FIGS. 1A and 1B is composed of an inner ring 2, an outer ring 3, tapered rollers 4, and a cage 5. The inner ring 2 includes a conical raceway surface 2a on its outer circumference, and the outer ring 3 includes a conical raceway surface 3a on its inner circumference. A plurality of the tapered rollers 4 are rollably interposed between the raceway surface 2a of the inner ring 2 and the raceway surface 3a of the outer ring 3. Each of the tapered rollers 4 is contained in a pocket formed in the cage 5 so that the axial movement of the tapered rollers 4 is restrained by a cone back face rib 2b and a cone front face rib 2c provided on respective sides of the raceway surface 2a of the inner ring 2.

The tapered roller bearing 1 has a roller coefficient γ of greater than 0.94. The roller coefficient γ indicates a roller filling factor and is defined by the following equation:

Roller coefficient $\gamma = (Z \times DA)/(\pi \times PCD)$

Here,
Z: the number of rollers,
DA: the average diameter of the rollers, and
PCD: pitch circle diameter of the rollers.

Figure 22:
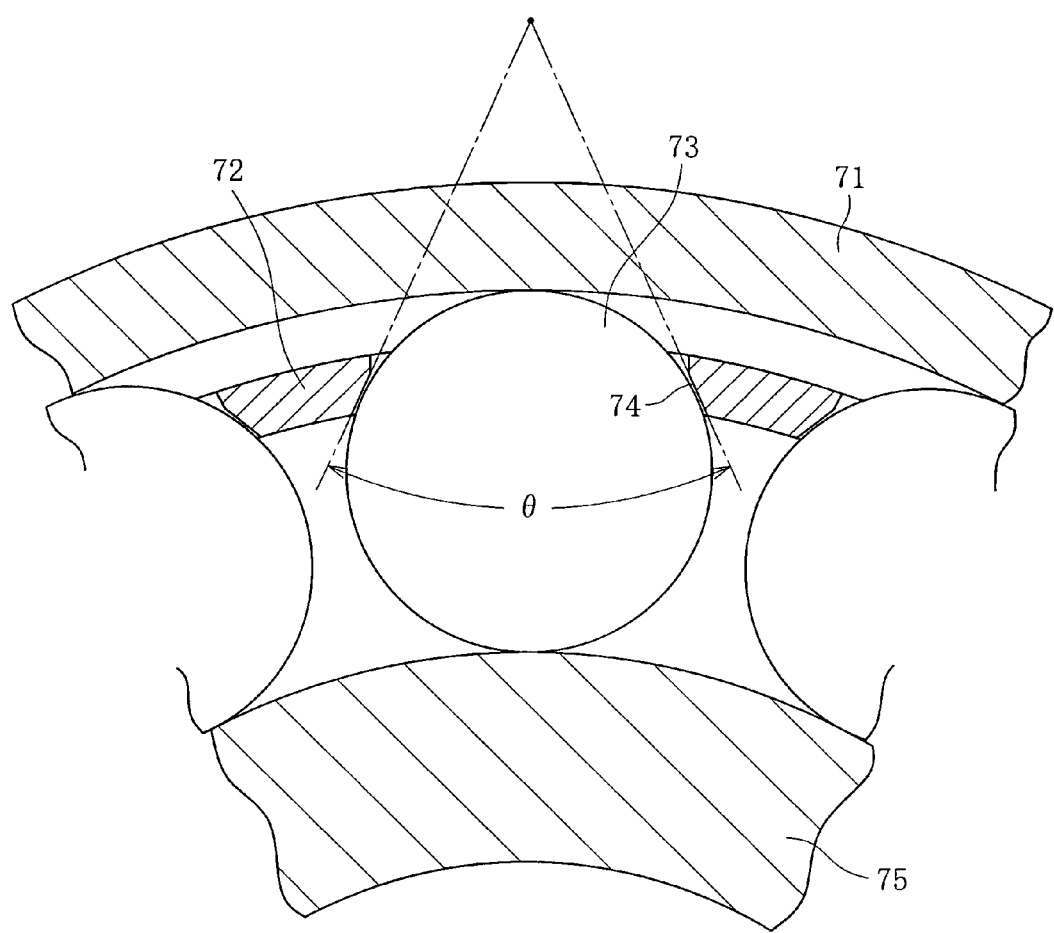
FIG. 22 is a partial enlarged cross-sectional view of a tapered roller bearing, illustrating a conventional technology.
Figure 23:
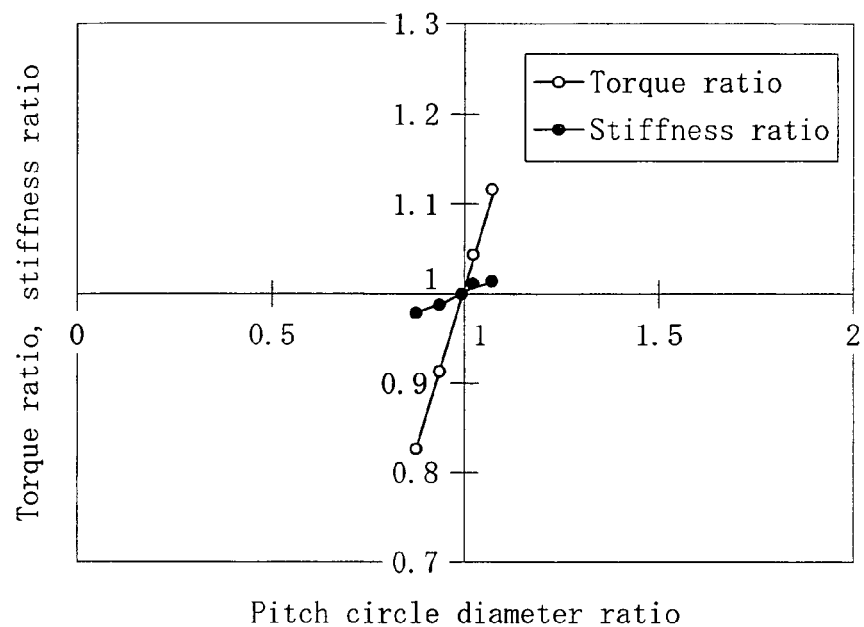
FIG. 23 is a graph showing changes in stiffness ratio (solid circles) and torque ratio (open circles) of a tapered roller bearing when the roller pitch circle diameter (PCD) is changed.

For comparison, a conventional technology is described with reference to FIG. 22. The tapered roller bearing shown in FIG. 22 is a typical tapered roller bearing provided with a cage that is spaced apart from the outer ring. This tapered roller bearing is designed such that a sufficient pillar width of a cage 72 is ensured while an outer ring 71 is prevented from coming into contact with the cage 72, and that the roller coefficient γ is 0.94 or less in order to obtain smooth rotation and a sufficient pillar strength of the cage 72. In FIG. 22, reference numerals 73, 74, and 75 represent a tapered roller, a pillar surface, and an inner ring, respectively, and symbol θ represents a window angle.

Figure 2:
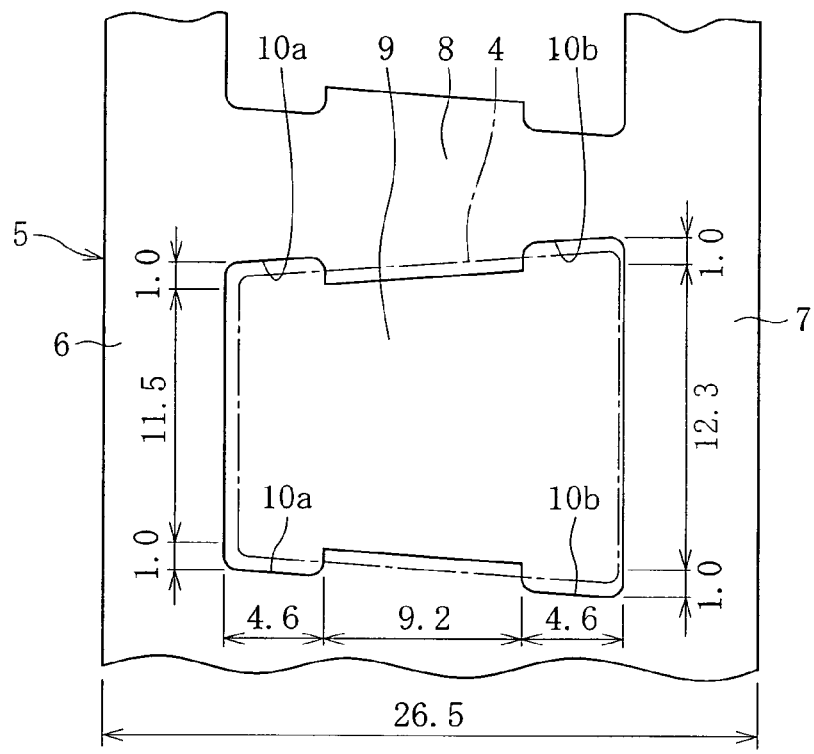
FIG. 2 is a developed plan view of a cage of the tapered roller bearing shown in FIG. 1B.

As shown in FIG. 1B, the cage 5 includes: a small annular portion 6 that is continuous on the small end face side of the tapered rollers 4; a large annular portion 7 that is continuous on the large end face side of the tapered rollers 4; and a plurality of bars 8 that connect the small annular portion 6 and the large annular portion 7. As shown in FIG. 2, a pocket 9 is formed between adjacent ones of the bars 8.

Each pocket 9 of the cage 5 has a trapezoidal shape having a narrow side that receives the small diameter side of the tapered roller 4 and a wide side that receives the large diameter side of the tapered roller 4. Each pocket 9 has cut-away portions on its narrow and wide sides. Specifically, two cut-away portions 10a and 10b are provided on each of the opposite sides of the bars 8, and each notch extends through the pillar portion 8 from the radially outer side to the radially inner side. Each of the cut-away portions 10a and 10b has dimensions of 1.0 mm depth and 4.6 mm width. It should be noted that the cut-away portions 10a and 10b exemplified in the drawing have a groove shape that extends through the cage 5 in the radial direction. However, the cut-away portions may have any shape and dimensions, so long as the communication between the radially inner and outer sides of the cage 5 is provided to allow smooth passage of the lubricating oil.

Figure 3:
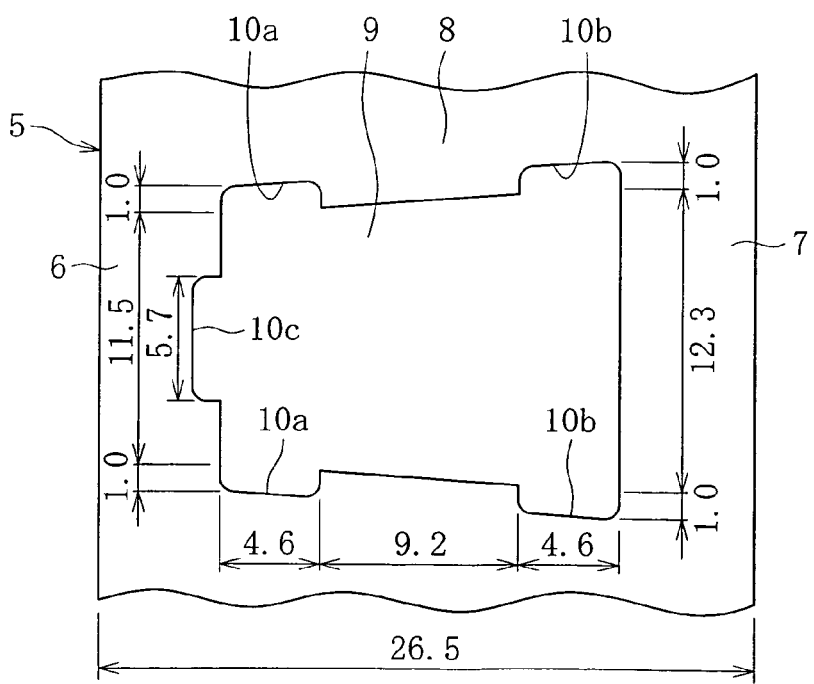
FIG. 3 is a developed plan view similar to FIG. 2, illustrating a modified example of the cage.
Figure 4:
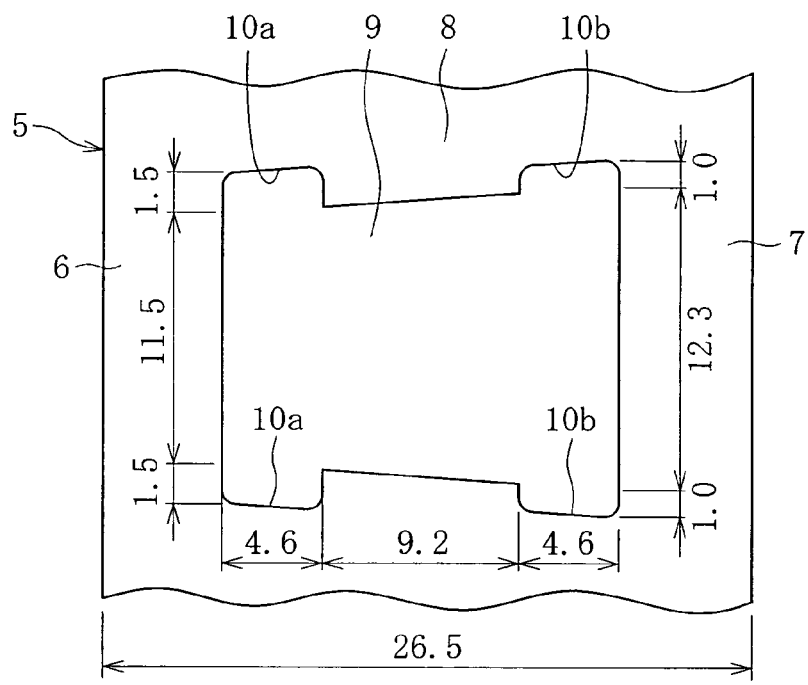
FIG. 4 is a developed plan view similar to FIG. 2, illustrating another modified example of the cage.

FIGS. 3 and 4 show modified examples of the cage 5. In the modified example shown in FIG. 3, another notch 10c is also provided in the small annular portion 6 on the narrow side of the pocket 9. Moreover, the total area of the three cut-away portions 10a and 10c on the narrow side is greater than the total area of the two cut-away portions 10b on the wide side. Note that the notch 10c has dimensions of 1.0 mm depth and 5.7 mm width. In the modified example shown in FIG. 4, the narrow-side cut-away bars 10a in the bars 8 each have a depth of 1.5 mm, which is greater than the depth of each wide-side notch 10b in the bars 8. In addition, the total area of the narrow-side cut-away portions 10a is greater than the total area of the wide-side cut-away portions 10b.

Figure 5:
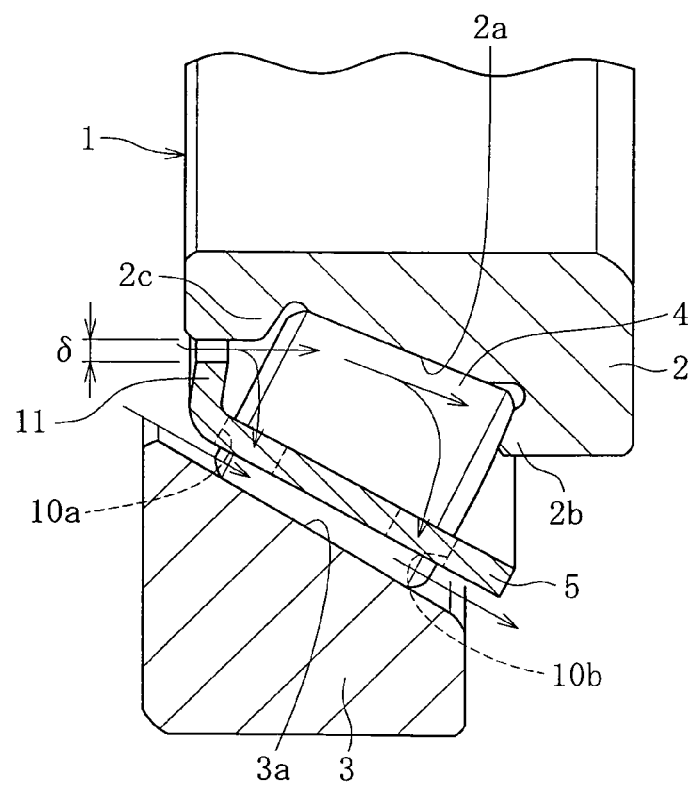
FIG. 5 is a partial enlarged view of FIG. 1B.

As shown in FIG. 5, a radially inward rib 11 is provided on the axially outer side of the small annular portion 6 of the cage 5 so as to face the radially outer surface of the cone front face rib 2c of the inner ring 2. The gap δ between the radially inner surface of the rib 11 and the radially outer surface of the cone front face rib 2c of the inner ring 2 is set to 2.0% or less of the outer radial dimension of the cone front face rib 2c.

Figure 29:
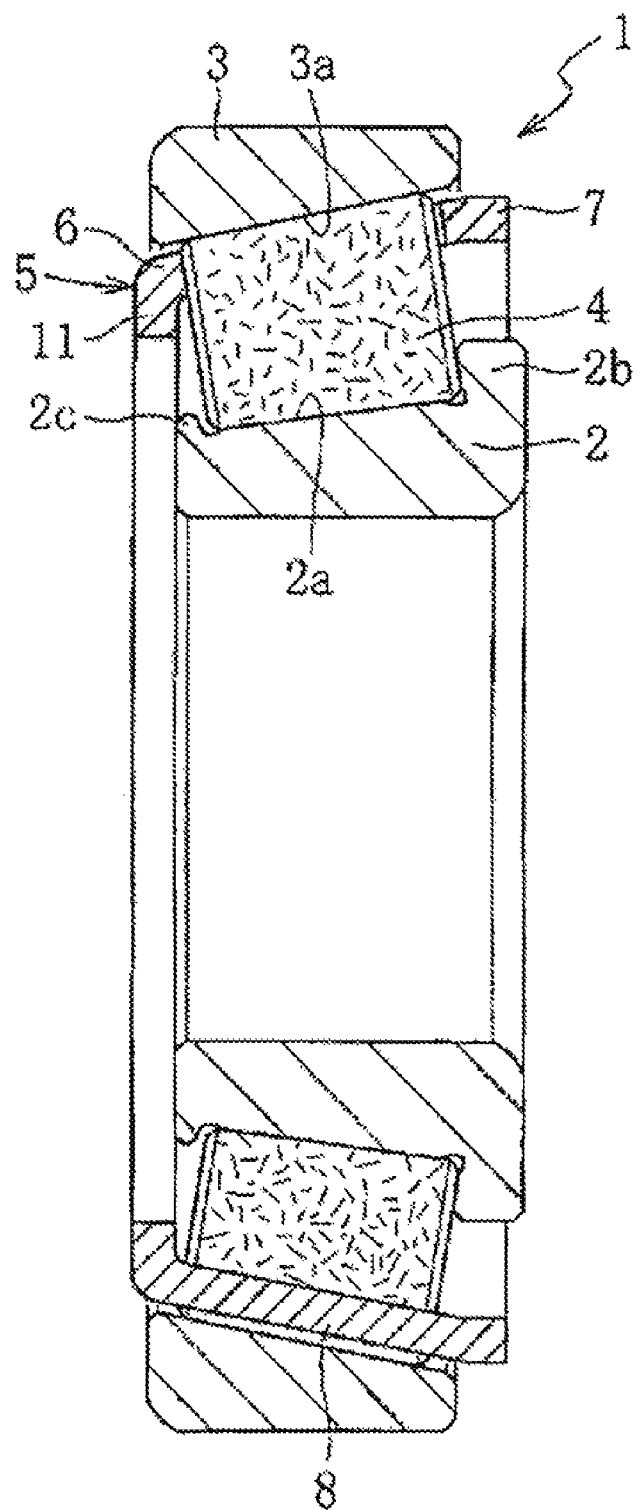
FIG. 29 is a schematic diagram illustrating micro-recessed dents in the surface of a tapered roller.

Each tapered roller 4 has a large number of micro-recessed dents (see FIG. 29) randomly distributed over its entire surface. The surface with the dents has a surface roughness parameter Ryni of 0.4 μM to 1.0 μm and an Sk value of −1.6 or less.

Figure 21A:
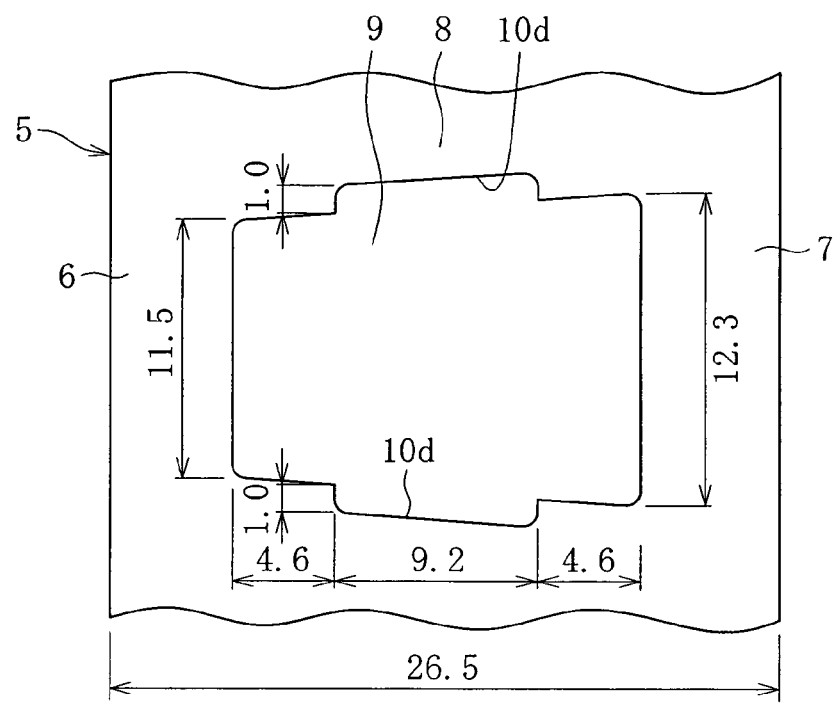
FIG. 21A is a developed plan view of a cage, illustrating a conventional technology.
Figure 21B:
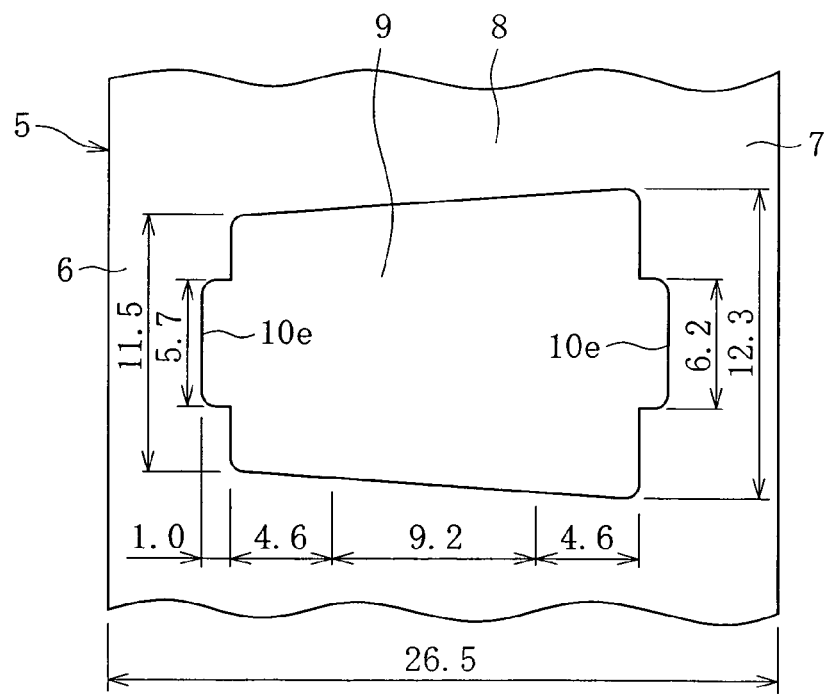
FIG. 21B is a developed plan view of another cage, illustrating a conventional technology.

A tapered roller bearing using the cage shown in FIG. 2 (Example 1) and a tapered roller bearing using the cage shown in FIG. 3 (Example 2) were prepared. In addition, as Comparative Examples, a tapered roller bearing using a cage having no notch in the pockets (Comparative Example 1) and tapered roller bearings using the cages shown in FIGS. 21A and 21B (Comparative Examples 2 and 3) were prepared. It should be noted that the tapered roller bearings each have dimensions of 100 mm outer diameter, 45 mm inner diameter, and 27.25 mm width, and all the parts thereof except the cut-away portions in the pockets are the same.

A torque measurement test was carried out on each of the tapered roller bearings of Examples and Comparative Examples using a vertical torque testing machine. The test conditions are as follows:

Axial load: 2,940 N,
Rotation speed: 300 to 2,000 r/min (100 r/min pitch), and
Lubricating condition: oil bath lubrication
(lubricating oil: 75W-90).

Figure 6:
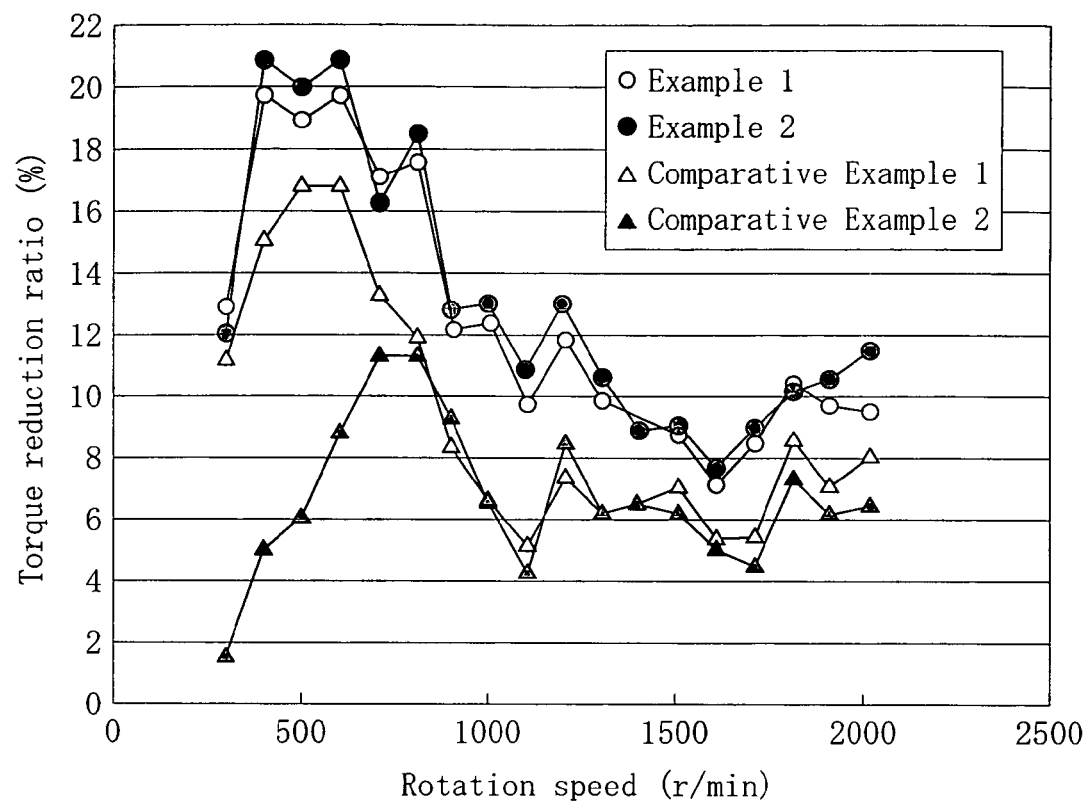
FIG. 6 is a graph showing the results of torque measurement tests.

FIG. 6 shows the test results. The vertical axis of the graph in FIG. 6 represents a torque reduction ratio relative to the torque obtained in Comparative Example in which the cage having no cut-away portions in the pockets was used. Some torque reduction effects were obtained in Comparative Example 1 in which the cut-away portions were provided in the central portions of the bars of the pockets and in Comparative Example 2 in which the cut-away portions were provided in the small and large annular portions of the pockets. However, in Example 1 in which the cut-away portions were provided on the narrow side of the bars of the pockets, the torque reduction effects were better than those in the Comparative Examples. In Example 2 in which the additional cut-away portions were provided in the small annular portions on the narrow side such that the total area of the narrow side cut-away portions is greater than the total area of the wide side cut-away portions, the torque reduction effects were even better.

The torque reduction ratio at 2,000 r/min, which is the maximum rotation speed in the test, was 9.5% for Example 1 and 11.5% for Example 2. Therefore, good torque reduction effects can be obtained under high rotational speed conditions in differentials, transmissions, and the like. Note that the torque reduction ratio at a rotation speed of 2,000 r/min was 8.0% for Comparative Example 2 and 6.5% for Comparative Example 3.

The cage 5 is integrally molded using resin and includes the small diameter side annular portion 6, the large diameter side annular portion 7, and the plurality of bars 8 that connect the small diameter side annular portion 6 and the large diameter side annular portion 7. A super engineering plastic such as PPS, PEEK, PA, PPA, or PAI is used as the material for the cage. If necessary, a material may be used which is prepared by adding glass fibers or carbon fibers to such a resin material or other engineering plastics in order to enhance the strength.

Examples of the engineering plastic include general purpose engineering plastics and super engineering plastics. Representative examples of the engineering plastic are listed below. However, these are by way of example only, and the engineering plastic is not limited thereto.

[General purpose engineering plastics] Polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), and ultra high molecular weight polyethylene (UHMW-PE).

[Super engineering plastics] Polysulfone (PSF), polyether sulfone (PES), polyphenylene sulfide (PPS), polyarylate (PAR), polyamideimide (PAI), polyetherimide (PEI), polyether ether ketone (PEEK), liquid crystal polymer (LCP), thermoplastic polyimide (TPI), polybenzimidazole (PBI), polymethylpentene (TPX), poly (1, 4-cyclohexane dimethylene terephthalate) (PCT), polyamide 46 (PA46), polyamide 6T (PA6T), polyamide 9T (PA9T), polyamide 11, 12 (PA11, 12), fluororesin, and polyphthalamide (PPA).

Figure 7:
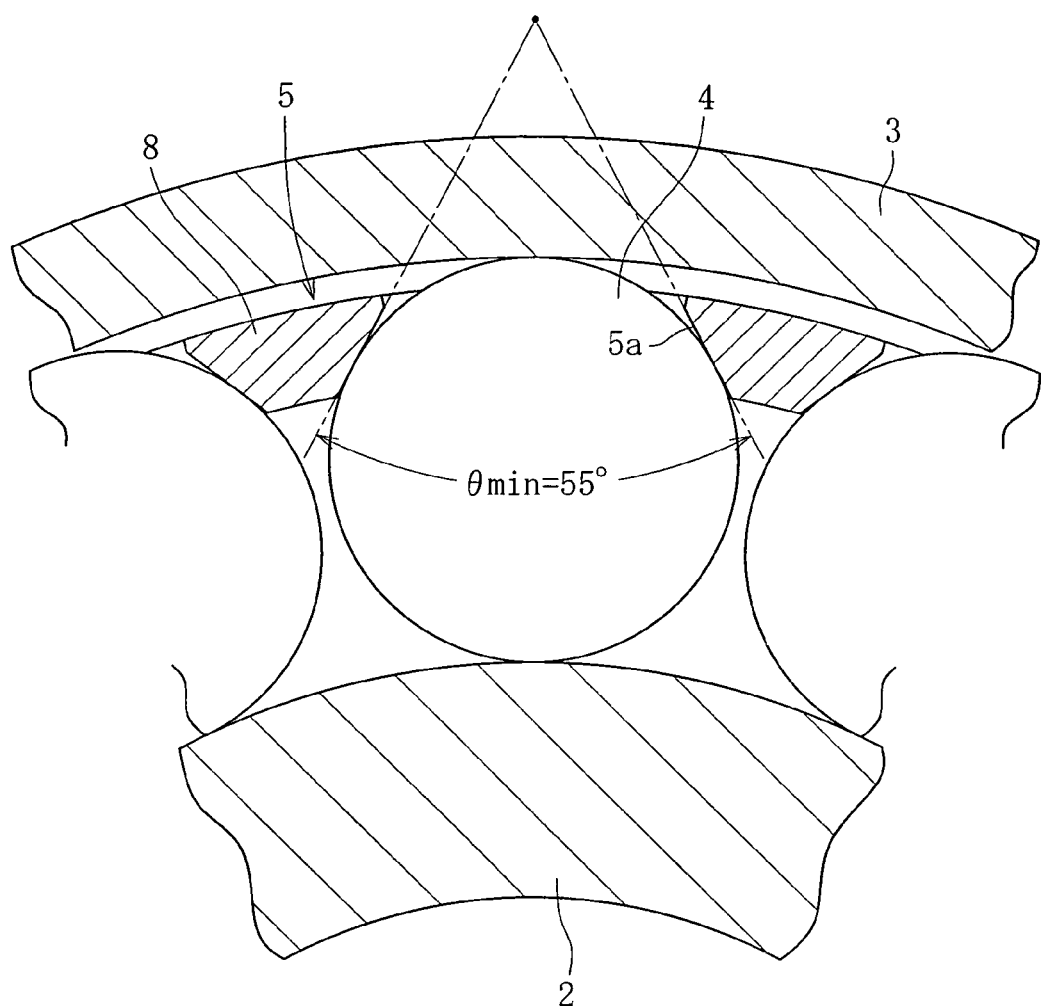
FIG. 7 is a partial enlarged cross-sectional view of a tapered roller bearing with the window angle being the lower limit.
Figures 8, 9:
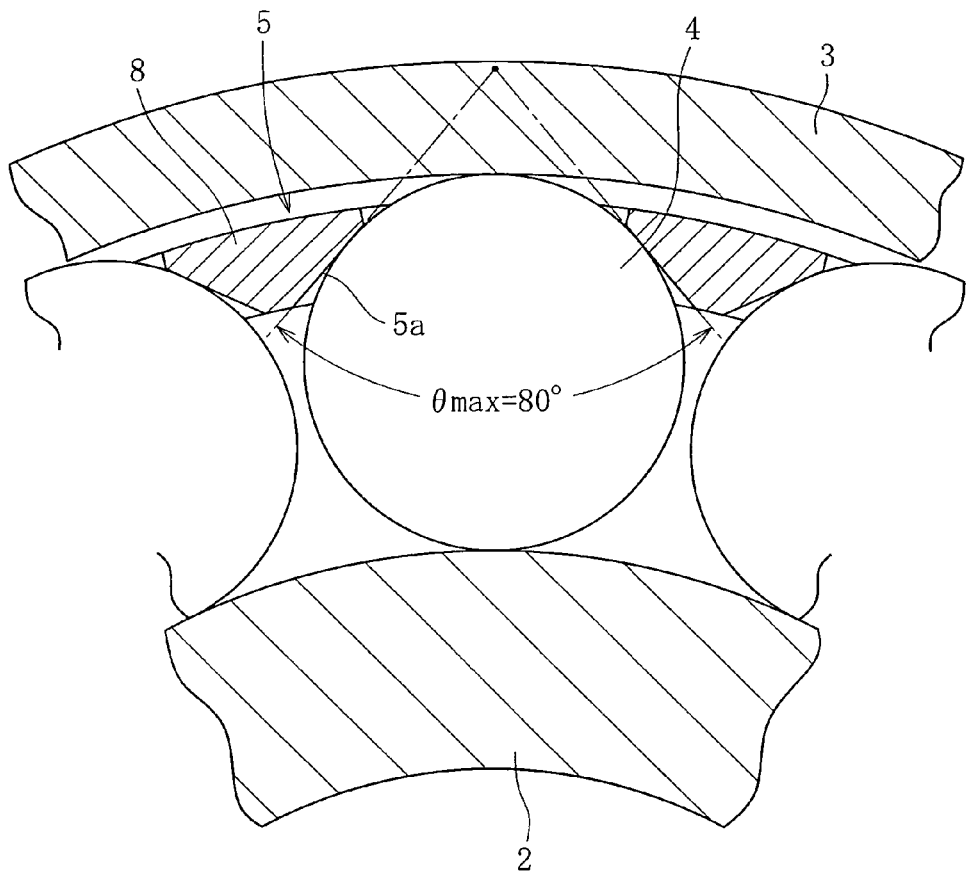
FIG. 8 is a partial enlarged cross-sectional view of a tapered roller bearing with the window angle being the upper limit.
FIG. 9 is a table showing the results of life tests of bearings.

With reference to FIGS. 7 and 8, a description is given of the window angle θ, which is the angle formed by bars 5a. The lower limit window angle θmin is 55° (FIG. 7), and the upper limit window angle θmax is 80° (FIG. 8). In the typical tapered roller bearing provided with the cage that is spaced apart from the outer ring (FIG. 22), the window angle is at most about 50°. The reason for setting the lower limit window angle θmin to 55° is for ensuring good contact conditions with the rollers. When the window angle is less than 55°, the contact conditions with the rollers are impaired. More specifically, when the window angle is 55° or more, γ can be greater than 0.94 while the strength of the cage is ensured, and good contact conditions can be ensured. Moreover, the reason for setting the upper limit window angle θmax to 80° is that, when the window angle exceeds 80°, the pressing force in the radial direction increases, causing the risk that smooth rotation cannot be obtained even when a self-lubricating resin material is used.

FIG. 9 shows the results of bearing life test. In FIG. 9, "Comparative Example 1" in the "bearing" column corresponds to the conventional typical tapered roller bearing in which the cage is spaced apart from the outer ring (FIG. 22). "Comparative Example 2" corresponds to the conventional tapered roller bearing except that only the roller coefficient γ is changed to γ>0.94. The "Example" corresponds to the tapered roller bearing of the present invention that has a roller coefficient γ of γ>0.94 and a window angle within the range of 55° to 80°. The test was carried out under the conditions of severe lubrication and excessive load. As is clear from FIG. 9, in "Comparative Example 2," the life was at least twice the life in "Comparative Example 1." The bearing of the "Example" has a roller coefficient of 0.96, which is the same as that in "Comparative Example 2." However, in the "Example," the life was about five times or more that in "Comparative Example 2." Note that in each of "Comparative Example 1," "Comparative Example 2," and the "Example," the dimensions are φ45×φ81×16 (in mm), and the number of rollers is 24 for "Comparative Example 1" and 27 for "Comparative Example 2" and the "Example." In addition, an oil film parameter Λ is 0.2.

Figure 10:
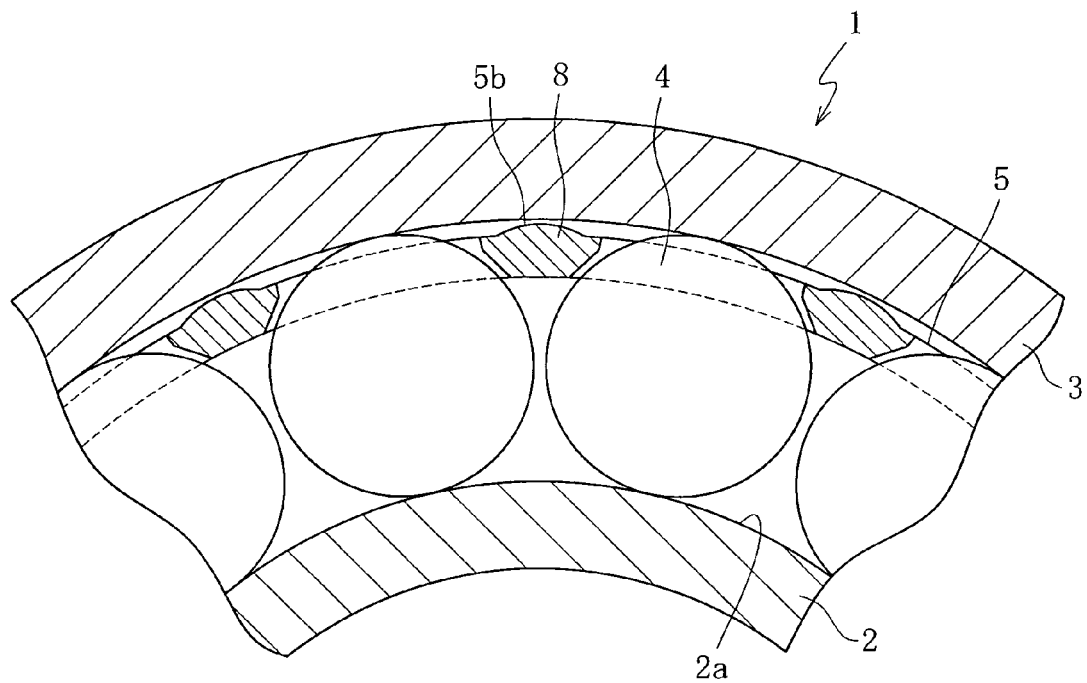
FIG. 10 is a partial horizontal cross-sectional view of a tapered roller bearing, illustrating a modified example of the cage.
Figure 11:
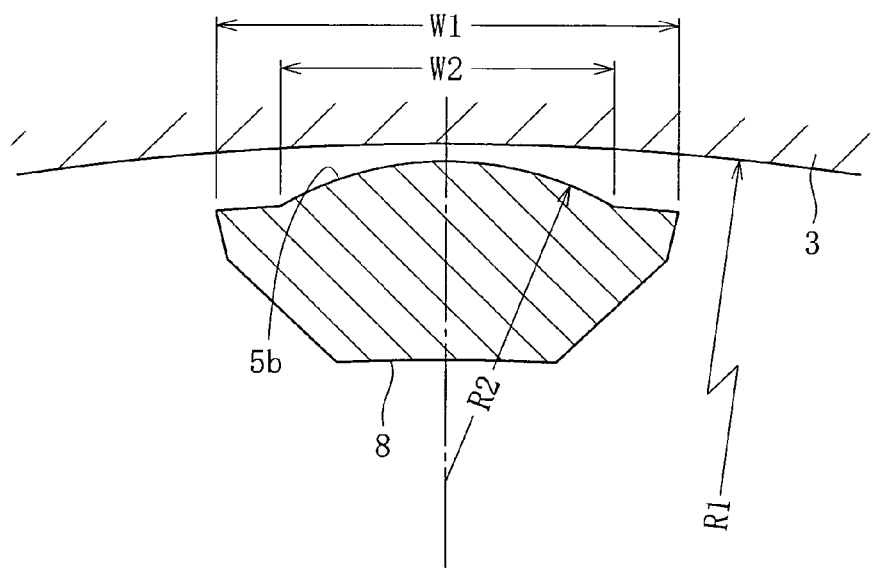
FIG. 11 is a partial enlarged view of FIG. 10.

In a modified example shown in FIGS. 10 and 11, a protrusion 5b protruding toward the raceway surface 3a of the outer ring 3 is formed on the radially outer surface of each pillar portion 8 of a cage 5 integrally formed of an engineering plastic. The rest of the configuration is the same as that of the cage 5 described above. The protrusion 5b has an arc-like cross-sectional outline shape taken along a direction crossing the pillar portion 8 as shown in FIG. 11. The radius of curvature $R_2$ of the arc shape is smaller than the radius $R_1$ of the raceway surface 3a of the outer ring 3. The reason for this is to form a favorable wedge-like oil film between the protrusion 5b and the raceway surface 3a of the outer ring 3. Desirably, the protrusion 5b is formed to have a radius of curvature $R_2$ of 70 to 90% of the radius $R_1$ of the raceway surface 3a of the outer ring 3. When the radius of curvature $R_2$ is less than 70% of the radius $R_1$, the opening angle of the wedge-like oil film is too large, and this results in a reduction in dynamic pressure. When the radius of curvature $R_2$ exceeds 90% of the radius $R_1$, the opening angle of the wedge-like oil film is too small, and this also results in a reduction in dynamic pressure. Desirably, the protrusion 5b is formed to have a lateral width $W_2$ of at least 50% of the lateral width $W_1$ of the pillar portion 8 ($W_2 \geqq 0.5 \times W_1$). This is because, when the lateral width $W_2$ is less than 50% of the lateral width $W_1$, the protrusion 5b cannot have a sufficient height for forming a favorable wedge-like oil film. The radius $R_1$ of the raceway surface 3a of the outer ring 3 is continuously changed from the large diameter side to the smaller diameter side. Therefore, the radius of curvature $R_2$ of the protrusion 5b is continuously changed from a larger radius of curvature $R_2$ in the large annular portion 7 to a smaller radius of curvature $R_2$ in the small annular portion 6 so as to follow the change in the radius $R_1$.

The tapered roller bearing 1 shown in FIGS. 10 and 11 is constituted as above. Therefore, when the bearing 1 rotates to cause the cage 5 to rotate, a wedge-like oil film is formed between the raceway surface of the outer ring and the protrusion 5b of the cage 5. This wedge-like oil film generates a dynamic pressure approximately proportional to the rotation speed of the bearing 1. Therefore, even when the pitch circle diameter (PCD) of the cage 5 is greater than conventional values to bring the cage 5 closer to the raceway surface 3a of the outer ring 3, the bearing 1 is allowed to rotate without excessive wear and torque loss. Thus, the number of rollers can be increased without causing any disadvantage.

Figure 12:
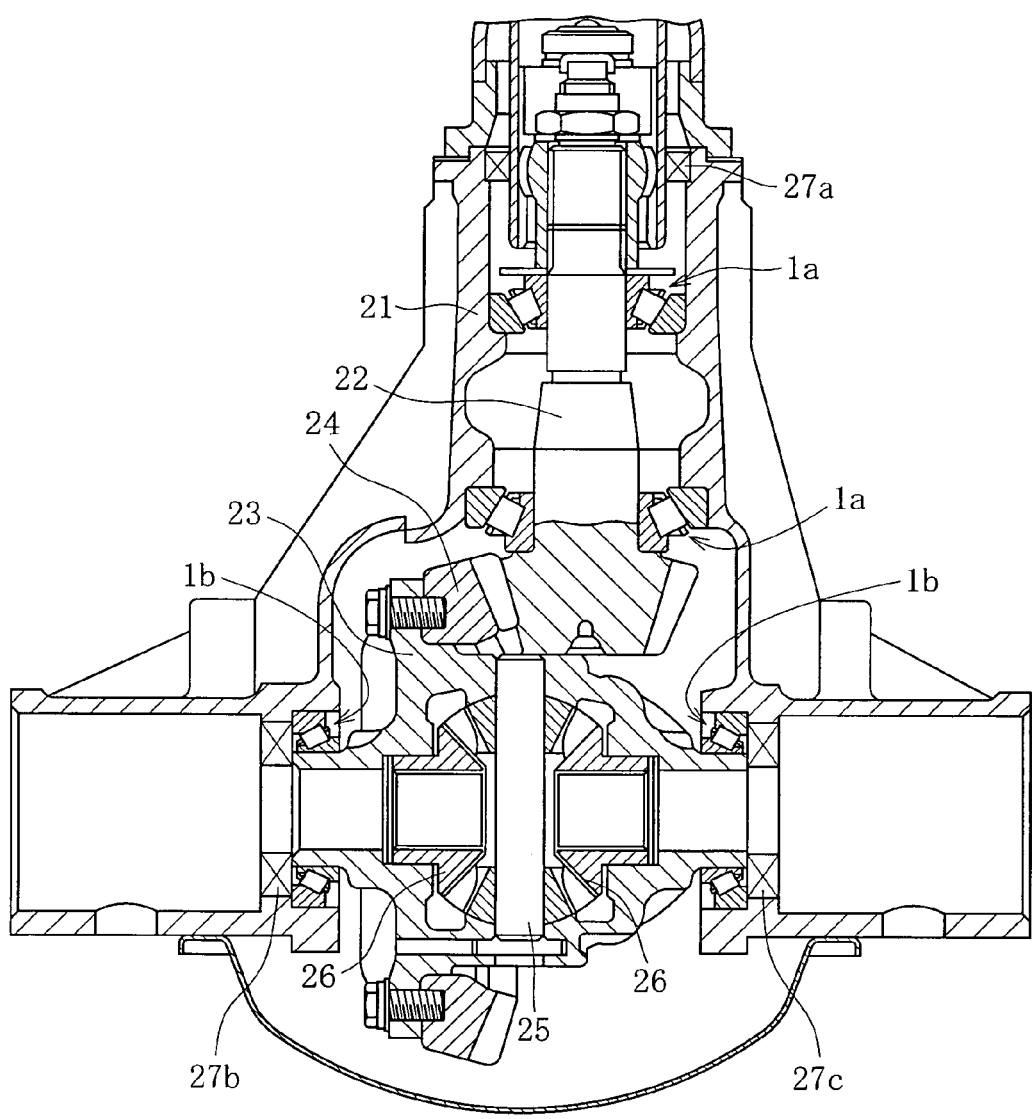
FIG. 12 is a cross-sectional view of a general vehicle transmission.

FIG. 12 shows an exemplary configuration of a vehicle differential in which the above tapered roller bearing can be used. In this differential, a drive pinion 22 connected to a propeller shaft (not shown) and inserted into a differential case 21 is engaged with a ring gear 24 attached to a differential gear case 23. A pinion gear 25 attached inside the differential gear case 23 is engaged with side gears 26 connected to drive shafts (not shown) inserted from the left and right sides into the differential gear case 23, whereby the driving force of an engine is transmitted to the left and right drive shafts through the propeller shaft. In this differential, the drive pinion 22 serving as a power transmission shaft and the differential gear case 23 are supported by a pair of tapered roller bearings 1a and a pair of tapered roller bearings 1b, respectively.

The differential case 21 is sealed with sealing members 27a, 27b, and 27c and stores a lubricating oil thereinside. Each of the tapered roller bearings 1a and 1b rotates with its lower portion immersed in the oil bath for the lubricating oil. When the tapered roller bearings 1a and 1b each rotate at high speed and their lower portions are immersed in the oil bath, the lubricating oil in the oil bath flows into the bearing from the small diameter side of the tapered roller 4 through separate paths on the radially outer and inner sides of the cage 5 as shown by arrows in FIG. 5. The lubricating oil flowing into the outer ring 3 from the radially outer side of the cage 5 flows along the raceway surface 3a of the outer ring 3, passes therethrough toward the large diameter side of the tapered roller 4, and flows out of the bearing. The amount of the lubricating oil flowing into the inner ring 2 side from the radially inner side of the cage 5 is significantly less than the amount of the lubricating oil flowing from the radially outer side of the cage 5. In addition, most of the lubricating oil flowing from the gap 6 passes through the cut-away portions 10a provided in the bars 8 and located on the narrow side of the pocket 9 and moves toward the radially outer side of the cage 5. Therefore, only a very small amount of the lubricating oil flows along the raceway surface 2a of the inner ring 2 and reaches the cone back face rib 2c so that the amount of the lubricating oil staying inside the bearing can be reduced.

Figure 13:
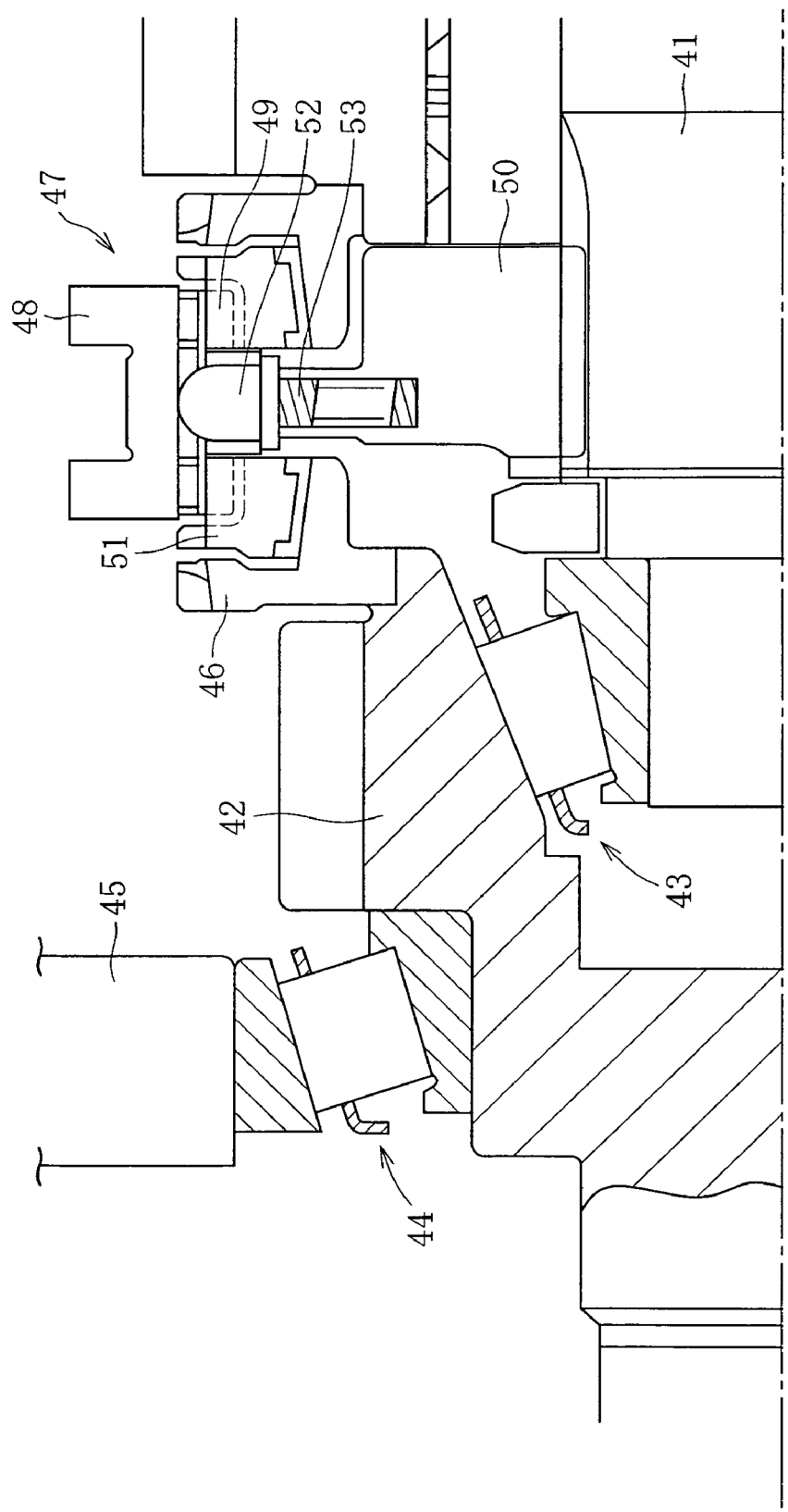
FIG. 13 is a cross-sectional view of a general vehicle differential.

FIG. 13 shows an exemplary configuration of a vehicle transmission in which the above tapered roller bearing can be used. This transmission is of the synchromesh type. In FIG. 13, the left side is an engine side, and the right side is a driving wheel side. A tapered roller bearing 43 is disposed between a main shaft 41 and a main driving gear 42. In this example, the raceway surface of the outer ring of the tapered roller bearing 43 is directly formed on the inner circumference of the main driving gear 42. The main driving gear 42 is supported by a tapered roller bearing 44 so as to be rotatable relative to a casing 45. The main driving gear 42 is connected to a clutch gear 46, and a synchronizer mechanism 47 is disposed in proximity to the clutch gear 46.

The synchronizer mechanism 47 includes: a sleeve 48 that moves in the axial direction (the left-right direction in the drawing) in response to the operation of a selector (not shown); a synchronizer key 49 attached to the inner circumference of the sleeve 48 so as to be movable in the axial direction; a hub 50 fitted onto the outer circumference of the main shaft 41; a synchronizer ring 51 slidably attached to the outer circumference (cone portion) of the clutch gear 46; a pressing pin 52 elastically pressing the synchronizer key 49 against the inner circumference of the sleeve 48; and a spring 53.

In the state shown in FIG. 13, the sleeve 48 and the synchronizer key 49 are held in neutral positions by the pressing pin 52. In this state, the main driving gear 42 idles on the main shaft 41. When the sleeve 48 is moved from the state shown in FIG. 13 toward, for example, the left side in the axial direction in response to the operation of the selector, the synchronizer key 49 is moved toward the left side in the axial direction so as to follow the movement of the sleeve 48 so that the synchronizer ring 51 is pressed against the inclined surface of the cone portion of the clutch gear 46. As a result, the rotation speed of the clutch gear 46 is reduced, and in contrast the rotation speed of the synchronizer mechanism 47 is increased. When the rotation speeds are synchronized with each other, the sleeve 48 is moved further left in the axial direction and is engaged with the clutch gear 46 so that the main shaft 41 and the main driving gear 42 are connected to each other through the synchronizer mechanism 47. In this manner, the main shaft 41 and the main driving gear 42 rotate synchronously.

In the tapered roller bearing 1 described above, at least one of the bearing components including the inner ring 2, the outer ring 3, and the tapered rollers 4 has a nitrogen-rich layer. A description is given of heat treatment including carbonitriding treatment. This heat treatment is employed as exemplary treatment for forming the nitrogen-rich layer.

Figure 14:
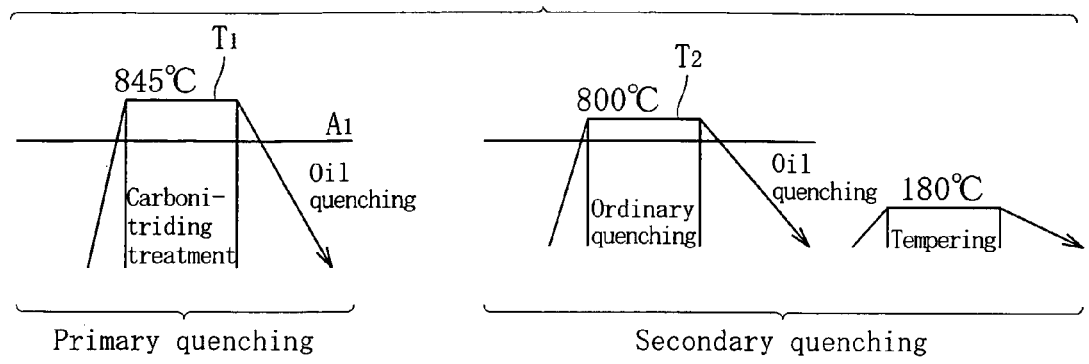
FIG. 14 is a diagram describing a heat treatment method for a tapered roller bearing.
Figure 15:
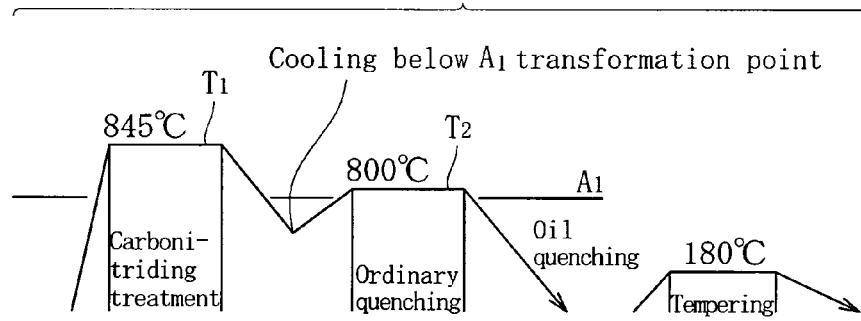
FIG. 15 is a diagram illustrating a modified example of the heat treatment method for a tapered roller bearing.

FIG. 14 is a diagram describing a heat treatment method for a rolling bearing in an embodiment of the present invention, and FIG. 15 is a diagram describing a modified example thereof. FIG. 14 shows a heat treatment pattern of the method in which primary quenching and secondary quenching are carried out. FIG. 15 shows a heat treatment pattern of the method in which the material is cooled below the A1 transformation point during the quenching process, then re-heated, and finally quenched. In treatment T1 in these drawings, while carbon and nitrogen are allowed to be diffused in the matrix of steel, carbon is sufficiently dissolved therein, and the material is cooled below the A1 transformation point. Next, in treatment T2 in the drawings, the material is re-heated to a temperature equal to or higher than the A1 transformation point and lower than the temperature used in treatment T1, and oil quenching is then carried out.

With the heat treatment procedures described above, while the surface layer is carbonitrided, cracking strength can be further improved, and dimensional change ratio over time can be further reduced as compared with those obtained by conventional carbonitriding quenching, i.e., carbonitriding treatment followed by single quenching. A roller bearing of the invention produced by the heat treatment pattern shown in FIG. 14 or 15 has a microstructure in which the grain size of austenite crystal grains is equal to or less than one-half that of conventional products. Bearing components having been subjected to the above heat treatment can have long rolling contact fatigue life, improved cracking strength, and reduced dimensional change ratio over time. Since a heat treatment process at a lowered secondary quenching temperature is used to reduce the size of crystal grains, the amount of retained austenite in the surface layer and internal region is reduced. This results in good crack resistant strength and resistance to dimensional changes over time.

Figure 16A:
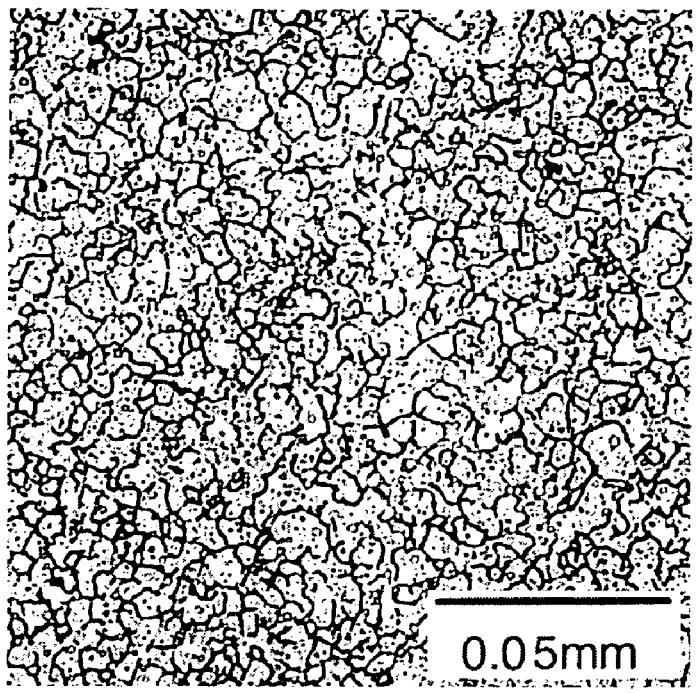
FIG. 16A is a structure diagram illustrating a microstructure, in particular, austenite grain boundaries, of a bearing component of an example of the present invention.
Figure 16B:
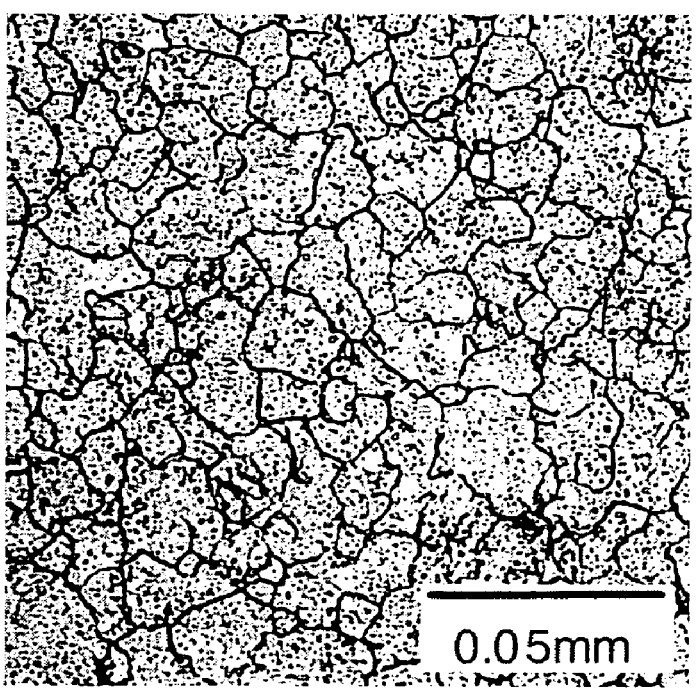
FIG. 16B is a structure diagram illustrating a microstructure, in particular, austenite grain boundaries, of a conventional bearing component.
Figure 17A:
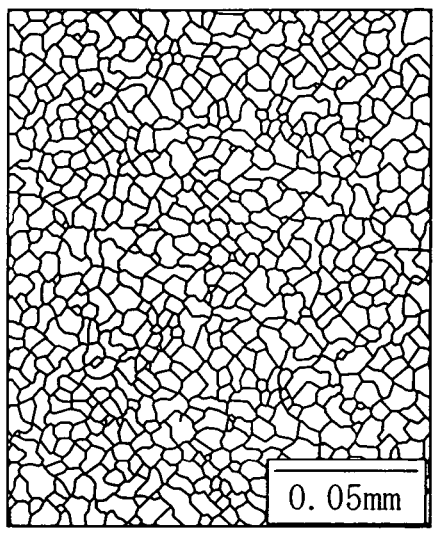
FIG. 17A is a structure diagram schematically illustrating the austenite grain boundaries shown in FIG. 16A.
Figure 17B:
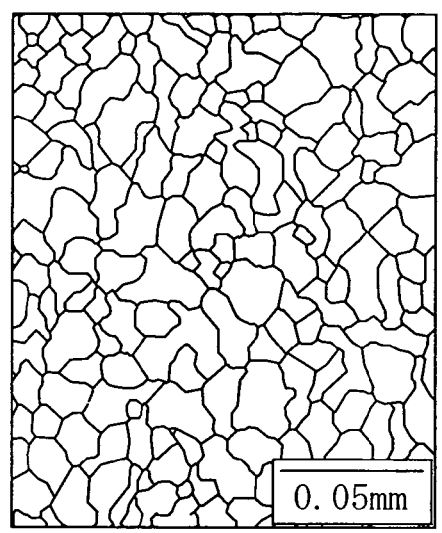
FIG. 17B is a structure diagram schematically illustrating the austenite grain boundaries shown in FIG. 16B.

FIGS. 16A and 16B are diagrams illustrating microstructures, particularly austenite grains, of bearing components. FIG. 16A shows an exemplary bearing component of the present invention, and FIG. 16B shows a conventional bearing component. More specifically, FIG. 16A represents the austenite crystal grain size of a bearing ring, having been subjected to the heat treatment pattern shown in FIG. 14, of a roller bearing of an embodiment of the present invention. For comparison, the austenite crystal grain size of bearing steel produced by a conventional heat treatment method is shown in FIG. 16B. The austenite crystal grain sizes shown in FIGS. 16A and 16B are schematically illustrated in FIGS. 17A and 17B. As can be seen from the structures of the austenite crystal grain sizes, the size of the conventional austenite grains corresponds to JIS grain size number 10, and fine grains of grain size number 12 can be obtained by using the heat treatment method shown in FIG. 14 or 15. The average grain size in FIG. 16A as measured by the section method was 5.6 μm.

Next, a description is given of Examples.

Example I

The following tests were performed using JIS SUJ2 material (1.0 wt % C-0.25 wt % Si-0.4 wt % Mn-1.5 wt % Cr): (1) measurement of the amount of hydrogen, (2) measurement of the size of crystal grains, (3) Charpy impact test, (4) measurement of fracture stress value, and (5) rolling contact fatigue test. The results are shown in Table 1.

The production history of each sample is as follows.

Samples A to D (Examples of the present invention): Carbonitriding treatment was performed at 850° C. for a holding time of 150 minutes. A mixed gas atmosphere of RX gas and ammonia gas was used. In the heat treatment pattern shown in FIG. 14, the primary quenching was performed from a carbonitriding treatment temperature of 850° C. Subsequently, the sample was heated to a temperature in a range of 780° C. to 830° C. lower than the carbonitriding treatment temperature, and the secondary quenching was performed. However, sample A having been subjected to heat treatment at a secondary quenching temperature of 780° C. was not used for the tests because of insufficient quenching.

Samples E and F (Comparative Examples): The carbonitriding treatment was performed using the same history as in Examples A to D of the present invention, but the secondary quenching temperature was 850° C. to 870° C., which is equal to or higher than the carbonitriding treatment temperature of 850° C.

Conventional carbonitrided product (Comparative Example): Carbonitriding treatment was performed at 850° C. for a holding time of 150 minutes. A mixed gas atmosphere of RX gas and ammonia gas was used. Quenching was performed directly from the carbonitriding temperature. Secondary quenching was not performed.

Ordinary quenched product (Comparative Example): Carbonitriding treatment was not performed. The sample was heated to 850° C. and then quenched. Secondary quenching was not performed.

Next, the test methods are described.

Measurement of the Amount of Hydrogen

The amount of hydrogen was determined by analyzing the amount of non-diffusive hydrogen in the steel using a hydrogen determinator DH-103 manufactured by LECO. The amount of diffusive hydrogen was not measured. The specifications of the hydrogen determinator DH-103 manufactured by LECO are as follows.

Analysis range: 0.01 to 50.00 ppm
Analysis accuracy: ±0.1 ppm or ±3% H (whichever larger)
Analysis sensitivity: 0.01 ppm
Detection method: heat conductivity method
Sample weight and size: 10 to 35 mg (max: 12 mm diameter×100 mm length)
Heating furnace temperature range: 50° C. to 1,100° C.
Reagent: anhydrone $Mg(ClO_4)_2$, ascarite NaOH
Carrier gas: nitrogen gas (a purity of 99.99% or more), gas dosing gas: hydrogen gas (a purity of 99.99% or more), pressure: 40 psi (0.27 MPa)

TABLE 1

|  | Sample | | | | | | Conventional | Ordinary |
|---|---|---|---|---|---|---|---|---|
|  | A | B | C | D | E | F | carbonitriding | quenching |
| Secondary quenching temperature (° C.) | 780 | 800 | 815 | 830 | 850 | 870 | — | — |
| Amount of Hydrogen (ppm) | — | 0.37 | 0.40 | 0.38 | 0.42 | 0.40 | 0.72 | 0.38 |
| Crystal grain size (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| Fracture stress value (MPa) | — | 2840 | 2780 | 2650 | 2650 | 2700 | 2330 | 2770 |
| Rolling contact fatigue life ratio ($L_{10}$) | — | 5.4 | 4.2 | 3.5 | 2.9 | 2.8 | 3.1 | 1 |

The outline of the measurement procedure is as follows. A sample is taken by a specifically designed sampler, and the sample, together with the sampler, is inserted into the hydrogen determinator mentioned above. Diffusive hydrogen in the interior is led to a heat conductivity detector by the nitrogen carrier gas. The amount of the diffusive hydrogen is not measured in this example. Next, the sample is taken out of the sampler and heated in a resistance heating furnace, and non-diffusive hydrogen is led to the heat conductivity detector by the nitrogen carrier gas. In the heat conductivity detector, the heat conductivity is measured, whereby the amount of the non-diffusive hydrogen can be determined.

Measurement of the Size of Crystal Grains

The size of crystal grains was measured according to an austenite crystal grain size testing method for steel specified in JIS G 0551.

Charpy Impact Test

A Charpy impact test was performed according to a Charpy impact testing method for metal materials specified in JIS Z 2242. A U-notched test piece (JIS No. 3 test piece) specified in JIS Z 2202 was used as the test piece.

Measurement of Fracture Stress Value

Figure 18:
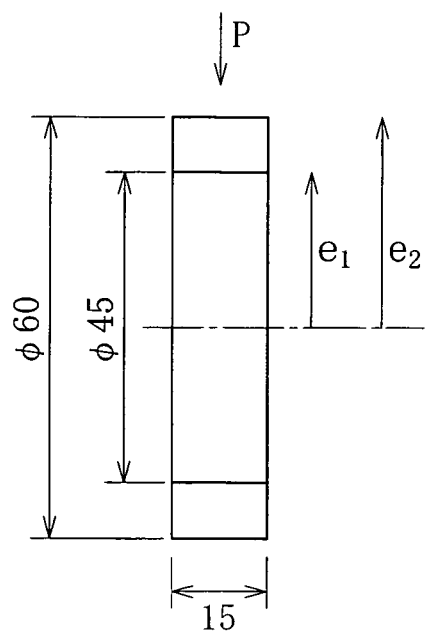
FIG. 18 is a diagram illustrating a test piece for static crushing strength test (measurement of fracture stress value).

FIG. 18 shows a test piece for static crushing strength test (fracture stress value measurement). A load is applied in direction P in the drawing, and the load at fracture is measured. Subsequently, the obtained fracture load is converted to stress values using stress calculation equations for a curved beam described below. It should be noted that the test piece is not limited to that shown in FIG. 18, and a test piece having a different shape may be used.

Let $\sigma_1$ be the fiber stress in the convex surface of the test piece shown in FIG. 18, and $\sigma_2$ be the fiber stress in the concave surface. Then, $\sigma_1$ and $\sigma_2$ can be determined using the equations below (Mechanical Engineers' Handbook A4, Materials and Mechanics A4-40). In the equations, N is the axial force in a cross-section including the axis of the annular test piece, A is the cross-sectional area, $e_1$ is the outer radius, and $e_2$ is the inner radius. In addition, $\kappa$ is the section modulus for a curved beam.

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 - e_2/\{\kappa(\rho_0 - e_2)\}]$$

$$\kappa = -(1/A)\int A\{\eta/(\rho_0 + \rho)\} dA$$

Rolling Contact Fatigue Life

Test conditions for a rolling contact fatigue life test are shown in Table 2. FIGS. 19A and 19B are schematic diagrams of a rolling contact fatigue life testing machine. FIG. 19A is a front view, and FIG. 19B is a side view. In FIGS. 19A and 19B, a rolling contact fatigue life test piece 18 is driven by a driving roll 12 and rotates in contact with balls 16. The balls 16 that are ¾ inch balls are guided by guide rolls 14 and roll with high surface pressure exerted against the rolling contact fatigue life test piece 18.

The test results of Example I shown in Table 1 are described below.

The Amount of Hydrogen

In the conventional carbonitrided product that was the as-carbonitrided product, the amount of hydrogen was as very high as 0.72 ppm. This may be because hydrogen produced by decomposition of ammonia ($NH_3$) contained in the atmosphere used in the carbonitriding treatment was introduced into the steel. In samples B to D, the amount of hydrogen was reduced to 0.37 to 0.40 ppm which are about one half that of the conventional product. These amounts of hydrogen are at the same level as that of the ordinarily quenched product.

Size of Crystal Grains

In the case where the secondary quenching temperature is lower than the quenching (primary quenching) temperature in the carbonitriding treatment, namely, in samples B to D, the size of the austenite crystal grains was significantly reduced to crystal grain size numbers of 11 to 12. In samples E and F, the conventional carbonitrided product, and ordinary quenched product, the crystal grain size number of the austenite grains was 10, which is coarser than those of samples B to D.

Charpy Impact Test

As shown in Table 1, although the Charpy impact value of the conventional carbonitrided product was 5.33 $J/cm^2$, samples B to D of the Examples of the invention showed high Charpy impact values of 6.30 to 6.65 $J/cm^2$. These samples showed a tendency that the lower the secondary quenching temperature, the higher the Charpy impact value. The Charpy impact value of the ordinary quenched product was as high as 6.70 $J/cm^2$.

Measurement of Fracture Stress Value

The fracture stress value mentioned above corresponds to crack resistant strength. As shown in Table 1, the fracture stress value of the conventional carbonitrided product was 2,330 MPa. In samples B to D, the fracture stress values were 2,650 to 2,840 MPa, which were improved as compared to that of the conventional product. The fracture stress value of the ordinarily quenched product was 2,770 MPa. Therefore, it is presumed that the improved crack resistant strength obtained in samples B to D may be not only due to the size reduction of the austenite crystal grains but also largely due to the reduction in the hydrogen content.

Rolling Contact Fatigue Test

As shown in Table 1, the rolling contact fatigue life $L_{10}$ of the ordinary quenched product was the lowest since this product does not have a carbonitrided layer in the surface layer. However, the rolling contact fatigue life of the conventional carbonitrided product was 3.1 times that of the ordinary quenched product. In samples B to D, the rolling contact fatigue life was significantly improved as compared to that of the conventional carbonitrided product. In samples E and F, the rolling contact fatigue life was substantially the same as that of the conventional carbonitrided product.

In summary, in samples B to D of the Examples of the present invention, the hydrogen content was reduced, and the austenite crystal grain size was reduced to grain size number of 11 or finer. In addition, the Charpy impact value, crack resistant strength, and rolling contact fatigue life thereof were also improved.

Example II

Next, a description is given of Example II. A series of tests was performed on materials X, Y, and Z described below. JIS SUJ2 material (1.0 wt % C-0.25 wt % Si-0.4 wt % Mn-1.5 wt % Cr) was used as a base material before heat treatment, and the base material was common to the materials X to Z. The production histories of materials X to Z are as follows.

Material X (Comparative Example): Ordinary quenching alone (no carbonitriding)

Material Y (Comparative Example): quenching as is after carbonitriding (conventional carbonitriding and quenching). The carbonitriding was performed at 845° C. for a holding time of 150 minutes. The atmosphere during the carbonitriding treatment was RX gas+ammonia gas.

Material Z (Example of the present invention): Bearing steel having been subjected to the heat treatment pattern of FIG. 14. The carbonitriding was performed at 845° C. for a holding time of 150 minutes. The atmosphere during the carbonitriding treatment was RX gas+ammonia gas. The temperature for final quenching was 800° C.

Rolling Contact Fatigue Life

The test conditions and testing machine for rolling contact fatigue life are as described above and shown in Table 2 and FIGS. 19A and 19B. The results of the rolling contact fatigue life test are shown in Table 3. As shown in Table 3, the $L_{10}$ life (the life until one of ten test pieces is fractured) of material Y which is the Comparative Example was 3.1 times longer than that of material X which is another Comparative Example, having been subjected to ordinary quenching alone. This shows that the carbonitriding treatment advantageously extends the life. In material Z of the Example of the present invention, the life was longer than those of Comparative Examples and was 1.74 times that of material Y and 5.4 times that of material X. The improvement may be mainly due to the finer microstructure.

TABLE 2

| Test piece | φ12 × 1.22 cylindrical test piece |
|---|---|
| Number of tests | 10 |
| Contacting steel ball | ¾ Inches (19.05 mm) |
| Conatct surface pressure | 5.88 GPa |
| Loading rate | 46240 cpm |
| Lubricating oil | Turbine VG68, forced lubrication |

TABLE 3

| | Life (number of loading cycles) | | |
|---|---|---|---|
| Material | $L_{10}$ (×10⁴ times) | $L_{10}$ (×10⁴ times) | Ratio of $L_{10}$ |
| Material X | 8017 | 18648 | 1.0 |
| Material Y | 24656 | 33974 | 3.1 |
| Material Z | 43244 | 69031 | 5.4 |

Charpy Impact Test

A Charpy impact test was performed using a U-notched test piece according to the above-described method specified in JIS Z 2242. The test results are shown in Table 4. The Charpy impact value of material Y (Comparative Example) having been subjected to carbonitriding treatment was not higher than that of material X (Comparative Example) having been subjected to ordinary quenching. However, the Charpy impact value of material Z was comparable to that of material X.

TABLE 4

| Material | Charpy impact value (J/cm²) | Ratio of impact value |
|---|---|---|
| Material X | 6.7 | 1.0 |
| Material Y | 5.3 | 0.8 |
| Material Z | 6.7 | 1.0 |

Static Fracture Toughness Test

FIG. 20 shows a test piece for a static fracture toughness test. A pre-crack of about 1 mm was formed in the notch portion of the test piece, and a static load was applied by 3-point bending to determine a fracture load P. Equation (1) below was used to compute a fracture toughness value (K1c). The test results are shown in Table 5. Since the depth of the pre-crack was greater than the depth of the carbonitrided layer, the results for materials X and Y of the Comparative Examples were substantially the same. However, the fracture toughness value of material Z of the Example of the present invention was about 1.2 times those of the Comparative Examples.

$$K1c=(PL\sqrt{a}/BW^2)\{5.8-9.2(a/W)+43.6(a/W)^2-75.3(a/W)^3+77.5(a/W)^4\} \quad (I)$$

TABLE 5

| Material | Number of tests | K1c (MPa√m) | Ratio of K1c |
|---|---|---|---|
| Material X | 3 | 16.3 | 1.0 |
| Material Y | 3 | 16.1 | 1.0 |
| Material Z | 3 | 18.9 | 1.2 |

Static Crushing Strength Test

The above-described test piece having a shape shown in FIG. 20 was used for a static crushing strength test. In the figure, a load was applied in the P direction to perform the static crushing strength test. The results of the test are shown in Table 6. Material Y having been subjected to carbonitriding treatment showed a static crushing strength slightly lower than that of material X having been subjected to ordinary quenching. However, in material Z of the Example of the present invention, the static crushing strength was improved as compared with that of material Y and was comparable to that of material X.

TABLE 6

| Material | Number of tests | Static crushing strength (kgf) | Ratio of static crushing strength |
|---|---|---|---|
| Material X | 3 | 4200 | 1.00 |
| Material Y | 3 | 3500 | 0.84 |
| Material Z | 3 | 4300 | 1.03 |

Dimensional Change Ratio Over Time

Table 7 shows the measurement results of dimensional change ratio over time measured at a holding temperature of 130° C. for a holding time of 500 hours, together with the surface hardness and the amount of retained austenite (in a depth of 50 μm). As can be seen from table 7, in material Z of the Example of the present invention, the dimensional change ratio was suppressed to one half or less of that of material Y containing a larger amount of retained austenite.

TABLE 7

| Material | Number of tests | Surface hardness (HRC) | Amount of retained γ (%) | Dimensional change ratio (×10⁴) | Ratio of dimensional change ratio |
|---|---|---|---|---|---|
| Material X | 3 | 62.5 | 8.8 | 18 | 1.0 |
| Material Y | 3 | 63.6 | 30.5 | 35 | 1.9 |
| Material Z | 3 | 60.0 | 11.8 | 22 | 1.2 |

Rolling Contact Fatigue Life Test in the Presence of Foreign Matter

A ball bearing 6206 was used to evaluate the rolling contact fatigue life in the presence of a predetermined amount of standard foreign matter. The test conditions are shown in Table 8, and the test results are shown in Table 9. The rolling contact fatigue life of material Y having been subjected to conventional carbonitriding treatment was about 2.5 times longer than that of material X, and the rolling contact fatigue life of material Z of the Example of the present invention was about 2.3 times longer than that of material X. Although the amount of retained austenite in material Z of the Example of the present invention was less than that of material Y of the Comparative Example, the life of material Z was long and comparable to that of material Y because of the introduction of nitrogen and the fine microstructure.

TABLE 8

| Load | Fr = 6.86 kN |
| --- | --- |
| Contact surface pressure | Pmax = 3.2 GPa |
| Rotation speed | 2000 rpm |
| Lubrication | Turbine 56, oil bath lubrication |
| Amount of foreign matter | 0.4 g/1000 cc |
| Foreign matter | Particle size of 100 to 180 μm, hardness of Hv 800 |

| Material | $L_{10}$life (h) | Ratio of $L_{10}$life |
| --- | --- | --- |
| Material X | 20.0 | 1.0 |
| Material Y | 50.2 | 2.5 |
| Material Z | 45.8 | 2.3 |

The above results show that material Z of the Example of the present invention simultaneously satisfies three requirements, i.e., extension of rolling contact fatigue life, improvement in cracking strength, and reduction in dimensional change ratio over time, which has been difficult to achieve with conventional carbonitriding treatment.

Example III

Table 10 shows the results of tests performed to determine the relationship between the nitrogen content and the rolling contact life in the presence of foreign matter. It should be noted that a standard quenched product was used for Comparative Example 1, and a standard carbonitrided product was used for Comparative Example 2. In Comparative Example 3, the same treatment as in Examples of the present invention was performed, but the amount of nitrogen was greater than those in the Examples. The test conditions are as follows.

Sample bearing: tapered roller bearing 30206 (inner and outer rings and rollers are made of high carbon chromium bearing steel class 2 (JIS SUJ2)).
Radial load: 17.64 kN
Axial load: 1.47 kN
Rotation speed: 2,000 r/min
Hard foreign matter added: 1 g/L

TABLE 10

| | | Nitrogen content (%) | Retained austenite (%) | Hardness (Hv) | Rolling contact life in the presence of foreign matter (h) | Size of austenite crystal grains |
| --- | --- | --- | --- | --- | --- | --- |
| Example | 1 | 0.11 | 14 | 725 | 321 | 11.8 |
| | 2 | 0.16 | 18 | 735 | 378 | 12.0 |
| | 3 | 0.18 | 20 | 730 | 362 | 11.9 |
| | 4 | 0.32 | 22 | 730 | 396 | 12.1 |
| | 5 | 0.61 | 24 | 715 | 434 | 12.2 |
| Comparative example | 1 | 0 | 8 | 770 | 72 | 9.8 |
| | 2 | 0.32 | 32 | 710 | 155 | 10.0 |
| | 3 | 0.72 | 31 | 700 | 123 | 12.0 |

As can be seen from Table 10, in Examples 1 to 5, the nitrogen content is substantially proportional to the life in the presence of foreign matter. However, in Comparative Example 3 in which the nitrogen content is 0.72, the rolling contact life in the presence of foreign matter was significantly reduced. Therefore, it is desirable that the upper limit of nitrogen content be 0.7.

Figure 24:
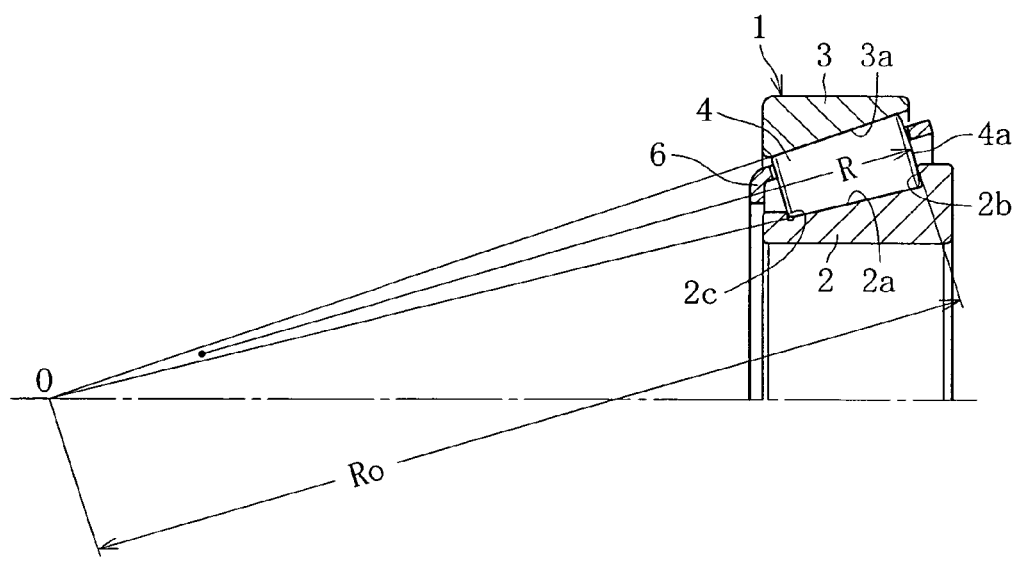
FIG. 24 is a cross-sectional view for describing the design specifications of a tapered roller bearing.
Figure 25:
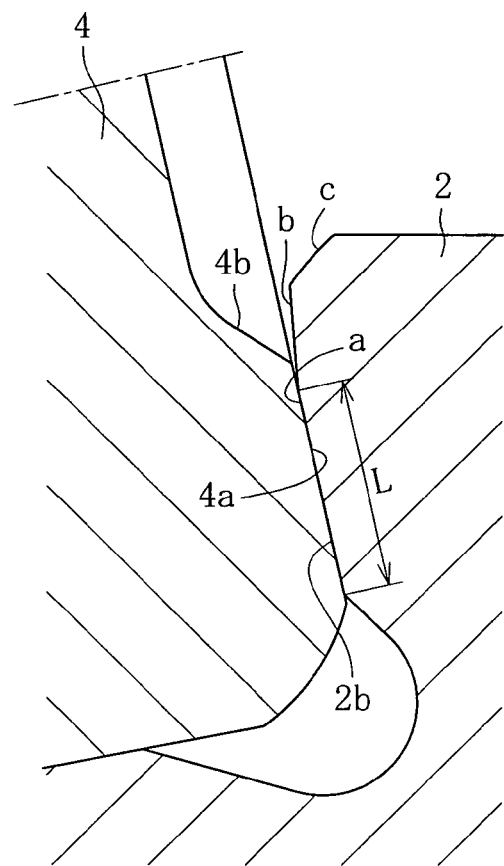
FIG. 25 is a partial enlarged view of the roller large end face side in FIG. 24.

Next, a description is given of an embodiment shown in FIGS. 24 and 25. As shown in FIG. 24, the apexes of the cone angles of tapered rollers 4, the apex of the cone angle of a raceway surface 2a of an inner ring 2, and the apex of the cone angle of a raceway surface 3a of an outer ring 3 coincide at a single point O on the center line of a tapered roller bearing 1. The tapered rollers 4 roll and move along the respective raceway surfaces 2a and 3a.

As enlarged in FIG. 25, a surface of the cone back face rib 2b of the inner ring 2 includes a conical surface a and a flank b having an arc-like cross-section and smoothly extending toward the radially outer side of the conical surface a, and a chamfer c is provided on the radially outer side of the flank b. The conical surface a is formed such that its center is located at a point O shown in FIG. 24. A large end face 4a of the tapered roller 4 is formed of a partial spherical surface with a radius of curvature R appropriately smaller than the distance $R_0$ from the point O to the surface of the cone back face rib 2b of the inner ring 2. A recess 4b having a circular shape is provided in the central portion of the partial spherical surface. The outer peripheral edge of the recess 4b is located in proximity to the boundary between the conical surface a and flank b of the surface of the cone back face rib 2b.

As described above, when the bearing is in use, each tapered roller 4 rolls with the large end face 4a pressed against the surface of the cone back face rib 2b. Therefore, a part of the partial spherical surface constituting the large end face 4a comes into contact with the conical surface a so that a contact ellipse L is formed therebetween (FIG. 25 shows the cross-section of the contact ellipse). The boundary between the conical surface a and the flank b is located in proximity to the outer periphery of the contact ellipse L, and an acute wedge-shaped gap defined by the partial spherical surface 4a and the flank b is formed in close proximity to the contact ellipse L.

The higher the axial load when the bearing is in use, the larger the contact ellipse L. Therefore, the position of a maximum contact ellipse under a maximum allowable axial load is estimated, and the boundary between the conical surface a and the flank b is placed in close proximity to the outer periphery of the maximum contact ellipse. In this manner, the wedge-shaped gap that draws the lubricating oil is formed so as to be appropriate over the entire range of load in use.

As described above, in the tapered roller bearing of this embodiment, the surface of the cone back face rib of the inner ring has the conical surface that comes into contact with the large end face of the tapered roller, and the curved flank is smoothly connected to the conical surface. In this manner, the acute wedge-shaped gap is formed outside the contact area so that the drawing action on the lubricating oil toward the contact area is improved. Therefore, a sufficient oil film is formed between the large end face of the tapered roller and the conical surface of the surface of the cone back face rib, and the smoothly formed flank can prevent the formation of flaws caused by contact with the surface of the cone back face rib of the inner ring when the tapered roller is skewed. In addition, when this tapered roller bearing is used to support a gear shaft, the maintenance cycle of the gear shaft supporting device can be significantly increased.

Figure 26:
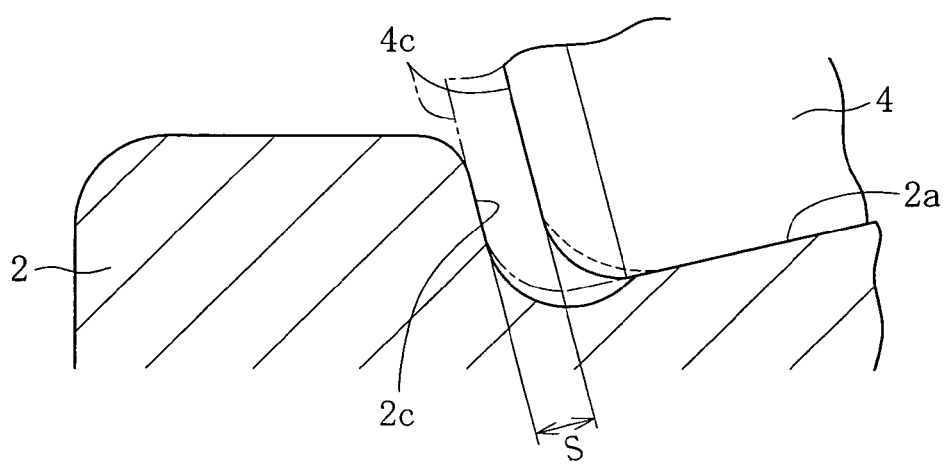
FIG. 26 is a partial enlarged view of the roller small end face side in FIG. 24.
Figure 27:
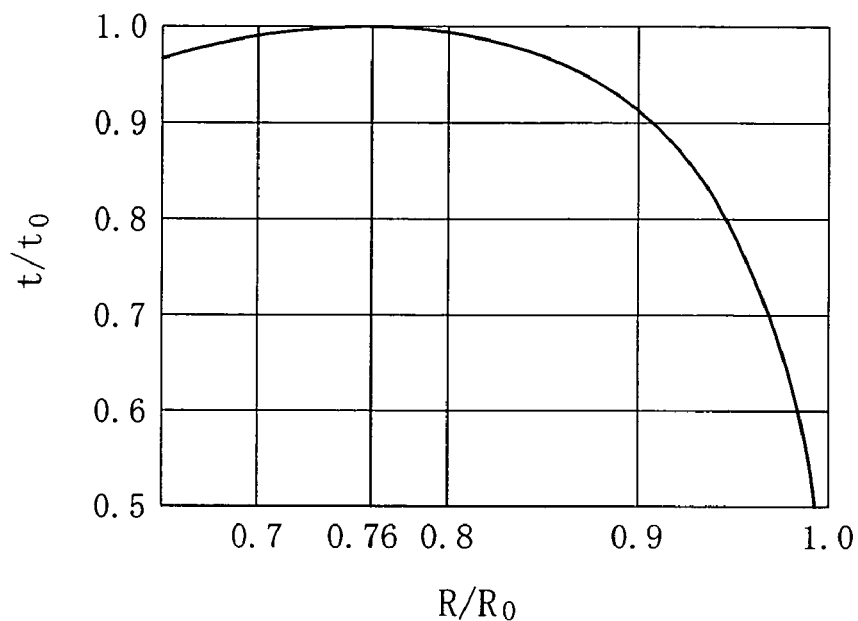
FIG. 27 is a graph showing the relationship between the radius of curvature of a roller large end face and the thickness of an oil film.
Figure 28:
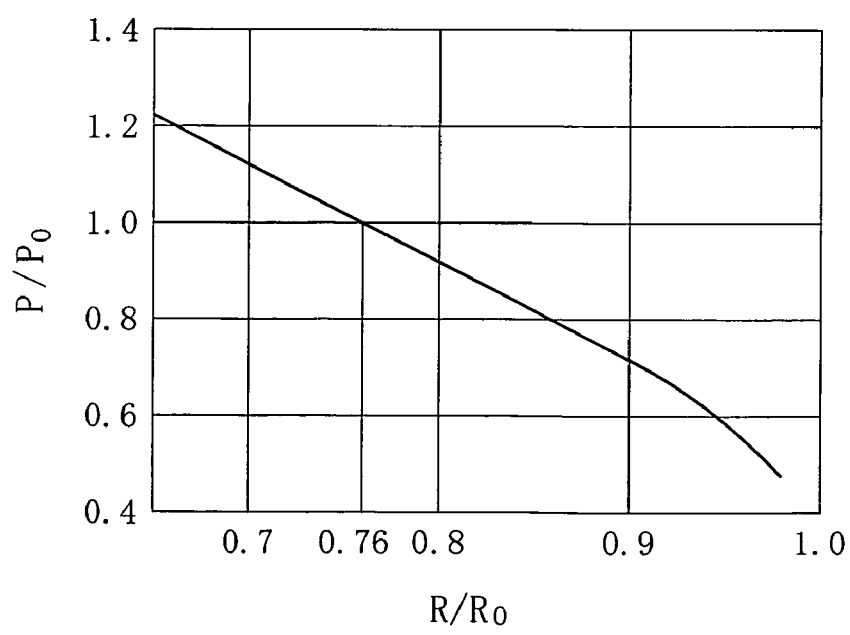
FIG. 28 is a graph showing the relationship between the radius of curvature of the roller large end face and the maximum hertz stress.

In an exemplary embodiment shown in FIG. 26, the surface of the cone front face rib of an inner ring is parallel to the small end faces of tapered rollers. More specifically, the surface of the cone front face rib 2c of the inner ring 2 is formed so as to be parallel to the small end faces 4c of the tapered rollers 4 disposed on the raceway surface 2a. In this manner, the influences of the chamfering dimensions and shape variations of the small end faces 4c of the tapered rollers 4 on the gaps between large end faces 4a of the tapered rollers 4 and a surface of the cone back face rib 2b of the inner ring 2 in an initial assembled state can be eliminated. (Note that the size of the above gaps in the initial assembled state is the same as the size of the gaps s between the small end faces 4c and the surface of the cone front face rib 2c of the inner ring 2 when the tapered rollers 4 are placed in position.) More specifically, in the initial assembled state, the surface of the cone front face rib 2c and each of the small end faces 4c are parallel to each other and come into surface contact with each other. Therefore, even when the chamfering dimensions and shapes of the small end faces 4c are different from each other as shown by broken lines in FIG. 26, the gaps between the large end faces 4a and the surface of the cone back face rib 2b are always constant in the initial assembled state. Accordingly, variations in time until the tapered rollers 4 are placed in position can be eliminated, and the running-in period can be reduced.

Let R be the center of curvature of the large end face 4a of each tapered roller 4, and $R_0$ be the distance from the point O to the surface of the cone back face rib 2b of the inner ring 2, as shown in FIG. 24. The ratio $R/R_0$ is set to a value within the range of 0.75 to 0.87. Moreover, the surface of the cone back face rib 2b of the inner ring 2 is ground so as to have a surface roughness Ra of 0.12 μm. The surface of the cone front face rib of the inner ring may be a ground surface or may be a lathe-turned surface for cost reduction.

Tapered roller bearings of Examples (Examples 6 to 9 in Table 11) were prepared. In each of these tapered roller bearings, the radius of curvature R of the large end faces 4a of the tapered rollers 4 was in the range of $R/R_0$=0.75 to 0.87, and the surface roughness Ra of the surface of the cone back face rib 2b of the inner ring 2 was 0.12 μm. In addition, the surface of the cone front face rib 2c was a ground surface parallel to the small end faces 4c of the tapered rollers 4. The dimensions of each bearing were 40 mm inner diameter and 60 mm outer diameter. Tapered roller bearings of Comparative Examples (Comparative Examples 4 to 6 in Table 11) were prepared. In each of these tapered roller bearings, the value of $R/R_0$ was outside the above range, and the surface of the cone front face rib of the inner ring was inclined outwardly with respect to the small end faces of the tapered rollers. The dimensions of each bearing were the same as those of the Examples.

A seizing resistance test was performed on each of the tapered roller bearings of the Examples and Comparative Examples using a rotation testing machine. In addition, a running-in test was performed on the roller bearings of Example 7 and Comparative Example 5. The number of samples for the running-in test was 66 for Example 7 and 10 for Comparative Example 5. The test conditions for the seizing resistance test are as follows.

Load: 19.61 kN

Number of revolutions: 1,000 to 3,500 r/min

Lubricating oil: Turbine VG56 (oiling amount: 40 mL/min, oiling temperature: 40° C.±3° C.)

TABLE 11

| Test bearing | | Radius of curvature $R/R_0$ | Surface roughness Ra (μm) | Limit of number of revolutions at which seizing occurs in seizing resistance test (r/min) | Number of revolutions until rollers are placed in position in running-in test (times) | |
|---|---|---|---|---|---|---|
| | | | | | Average value | Standard deviation |
| Example | 6 | 0.75 | 0.12 | 2700 | — | — |
| | 7 | 0.80 | 0.12 | 3500 | 2.95 | 0.56 |
| | 8 | 0.85 | 0.12 | 3000 | — | — |
| | 9 | 0.87 | 0.12 | 2700 | — | — |
| Comparative example | 4 | 0.70 | 0.12 | 2200 | — | — |
| | 5 | 0.94 | 0.12 | 2500 | 6.00 | 1.33 |
| | 6 | 0.94 | 0.25 | 2200 | — | — |

The test results are shown in Table 11. In the seizing resistance test, seizing occurred between the surface of the cone back face rib of the inner ring and the large end face of the tapered roller.

In each of the tapered roller bearings of the Comparative Examples, the limit of the number of revolutions at which seizing occurs during the seizing resistance test was less than 2700 r/min. Therefore, a problem may arise under normal use conditions of differentials and the like. In Comparative Example 6 in which the surface roughness Ra of the surface of the cone back face rib is large, the limit of the number of revolutions at which seizing occurs was lower than that of Comparative Example 5 in which the radius of curvature R is the same as that in Comparative Example 6.

As can be seen from the results of the running-in test, the average of the numbers of revolutions until the tapered rollers were placed in position was 6 for the Comparative Example. However, in the Example, the average of the numbers of revolutions was 2.96, which is about one-half that in the Comparative Example. In the Example, the standard deviation of the variations in the numbers of revolutions was small, and therefore the running-in time can be stably reduced.

As described above, in the tapered roller bearing of this embodiment, the radius of curvature R of the large end faces of the tapered rollers is set to a value in the range of $R/R_0$=0.75 to 0.87, and the surface of the cone front face rib of the inner ring is formed of a surface parallel to the small end faces of the tapered rollers. Therefore, the torque loss and heat generation due to slip friction between the surface of the cone back face rib of the inner ring and the large end faces of the tapered rollers can be reduced so that the occurrence of seizing can be prevented. In addition, the running-in period can be reduced so that the efficiency of the attachment operation of the bearing can be improved. Moreover, the durability of gear shat supporting devices for vehicles can be improved.

The embodiments disclosed herein are to be considered as in all aspects illustrative but not restrictive. The scope of the present invention should be defined by the scope of the claims rather than by the description of the foregoing embodiments, and all modifications within the scope of the claims and within the meaning and scope of equivalence of the claims are intended to be included within the scope of the present invention.

The invention claimed is:

1. A tapered roller bearing comprising:
   an inner ring;
   an outer ring;
   a plurality of tapered rollers rollably disposed between the inner ring and the outer ring; and
   a cage for holding the tapered rollers at predetermined circumferential intervals, wherein:
   a roller coefficient γ of the tapered roller bearing is greater than 0.94;
   at least one of the inner ring, the outer ring, and the tapered rollers has a nitrogen-rich layer, the nitrogen-rich layer having austenite crystal grains with a grain size number greater than 10;
   the inner ring has a cone back face rib having a surface including a conical surface in contact with large end faces of the tapered rollers and a flank that smoothly extends outwardly from the conical surface and is curved in a direction away from the large end faces of the tapered rollers;
   the cage includes a small annular portion continuous on a small end face side of the tapered rollers, a large annular portion continuous on a large end face side of the tapered rollers, and a plurality of bars connecting the small annular portion and the large annular portion;
   the cage has a plurality of trapezoidal pockets formed between adjacent ones of the bars, each of the trapezoidal pockets having a narrow side that receives a small diameter side of one of the tapered rollers and a wide side that receives a large diameter side of the one of the tapered rollers, and each of the bars having a cut-away portion on the narrow side of the trapezoidal pockets; and
   a width of the small annular portion of the cage adjacent to corner portions of the trapezoidal pockets is not narrower than a width of the small annular portion of the cage adjacent to a central portion of the narrow side of each of the trapezoidal pockets.

2. A tapered roller bearing according to claim 1, wherein the flank has an arc-like cross-sectional shape.

3. A tapered roller bearing according to claim 2, wherein:
   a central portion of each of the large end faces of the tapered rollers has a recess with a circular shape; and
   an outer periphery of each of the recesses is located in proximity to a boundary between the conical surface of the surface of the cone back face rib of the inner ring and the flank.

4. A tapered roller bearing according to claim 2, wherein a boundary between the conical surface of the surface of the cone back face rib of the inner ring and the flank is located in proximity to an outer periphery of a maximum contact ellipse that is formed by contact between the large end faces of the tapered rollers and the surface of the cone back face rib of the inner ring.

5. A tapered roller bearing according to claim 2, wherein:
   the inner ring has a cone front face rib having a surface including a surface parallel to small end faces of the tapered rollers; and
   $R/R_0$ falls within the range of 0.75 to 0.87, where R is a radius of curvature of the large end faces of the tapered rollers, and $R_0$ is a distance from an apex of a cone angle of each of the tapered rollers to the surface of the cone back face rib of the inner ring.

6. A tapered roller bearing according to claim 1, wherein:
   a central portion of each of the large end faces of the tapered rollers has a recess with a circular shape; and
   an outer periphery of each of the recesses is located in proximity to a boundary between the conical surface of the surface of the cone back face rib of the inner ring and the flank.

7. A tapered roller bearing according to claim 6, wherein a boundary between the conical surface of the surface of the cone back face rib of the inner ring and the flank is located in proximity to an outer periphery of a maximum contact ellipse that is formed by contact between the large end faces of the tapered rollers and the surface of the cone back face rib of the inner ring.

8. A tapered roller bearing according to claim 6, wherein:
   the inner ring has a cone front face rib having a surface including a surface parallel to small end faces of the tapered rollers; and
   $R/R_0$ falls within the range of 0.75 to 0.87, where R is a radius of curvature of the large end faces of the tapered rollers, and $R_0$ is a distance from an apex of a cone angle of each of the tapered rollers to the surface of the cone back face rib of the inner ring.

9. A tapered roller bearing according to claim 1, wherein a boundary between the conical surface of the surface of the cone back face rib of the inner ring and the flank is located in proximity to an outer periphery of a maximum contact ellipse that is formed by contact between the large end faces of the tapered rollers and the surface of the cone back face rib of the inner ring.

10. A tapered roller bearing according to claim 1, wherein:
    the inner ring has a cone front face rib having a surface including a surface parallel to small end faces of the tapered rollers; and
    $R/R_0$ falls within the range of 0.75 to 0.87, where R is a radius of curvature of the large end faces of the tapered rollers, and $R_0$ is a distance from an apex of a cone angle of each of the tapered rollers to the surface of the cone back face rib of the inner ring.

11. A tapered roller bearing according to claim 10, wherein the surface of the cone back face rib of the inner ring has a surface roughness Ra of 0.05 to 0.20 μm.

12. A tapered roller bearing according to claim 1, wherein a nitrogen content in the nitrogen-rich layer is in the range of 0.1% to 0.7%.

13. A tapered roller bearing according to claim 1, wherein a window angle of each of the trapezoidal pockets is 55° or more and 80° or less.

14. A tapered roller bearing according to claim 1, wherein the cage is formed of an engineering plastic that is oil and heat resistant.

15. A tapered roller bearing according to claim 1, wherein the small annular portion of the cage adjacent to the central portion of the narrow side of each of the trapezoidal pockets has a cut-away portion provided therein.

16. A tapered roller bearing according to claim 1, wherein each of the bars also has a cut-away portion provided on the wide side of the trapezoidal pockets.

17. A tapered roller bearing according to claim 16, wherein a total area of the cut-way portions provided on the narrow side of the trapezoidal pockets is greater than a total area of the cut-way portions provided on the wide side of the trapezoidal pockets.

18. A tapered roller bearing according to claim 1, wherein:
the inner ring has a cone front face rib;
the cage has a radially inward rib provided on an axially outer side of the small annular portion of the cage, the radially inward rib facing a radially outer surface of the cone front face rib of the inner ring; and
an upper limit of a gap between a radially inner surface of the radially inward rib and the radially outer surface of the cone front face rib of the inner ring is 2.0% of an outer radial dimension of the cone front face rib.

19. A tapered roller bearing according to claim 1, wherein:
surfaces of the tapered rollers have micro-recessed dents randomly formed thereon;
a surface roughness parameter Ryni of the surfaces having the dents is $0.4 \leqq Ryni \leqq 1.0$ μm; and
an Sk value of the surfaces having the dents is −1.6 or less.

20. A tapered roller bearing according to claim 1, for supporting a power transmission shaft of an automotive vehicle.

* * * * *